(12) United States Patent
Craig et al.

(10) Patent No.: US 8,090,323 B2
(45) Date of Patent: Jan. 3, 2012

(54) REVERSE LINK OPTIMIZED CHANNEL QUALITY ESTIMATION

(75) Inventors: Stephen G. Craig, Nacka (SE); Nils Brännström, Solna (SE); Olof Enander, Uppsala (SE); Raimundas Gaigalas, Solna (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 903 days.

(21) Appl. No.: 12/042,084

(22) Filed: Mar. 4, 2008

(65) Prior Publication Data

US 2009/0227209 A1 Sep. 10, 2009

(51) Int. Cl.
*H04B 17/00* (2006.01)
*H04B 1/00* (2006.01)
*H04B 7/00* (2006.01)

(52) U.S. Cl. ............ 455/67.13; 455/67.11; 455/69

(58) Field of Classification Search .......... 455/67.13, 455/67.11, 522, 501, 502, 503, 115.1, 127.1, 455/452.2, 24, 69, 161.3, 63.1
See application file for complete search history.

(56) References Cited

U.S. PATENT DOCUMENTS
7,477,876 B2 * 1/2009 Das et al. ........... 455/67.13

FOREIGN PATENT DOCUMENTS
WO WO 2005/074312 A1 8/2005
WO WO 2006/065181 A1 6/2006

OTHER PUBLICATIONS
International Search Report for PCT/SE2009/050158 mailed Jun. 30, 2009.
* cited by examiner

*Primary Examiner* — Eugene Yun
(74) *Attorney, Agent, or Firm* — Myers Bigel Sibley & Sajovec, P.A.

(57) ABSTRACT

A device associated with a network receives feedback information associated with a data channel, and determines whether a condition in the data channel is changing based on the feedback information associated with the data channel. The device also calculates an implicit channel quality estimate based on the feedback information. The device further transmits a trigger requesting a channel quality report when the condition in the data channel is changing, and receives the requested channel quality report.

26 Claims, 14 Drawing Sheets

REVERSE LINK OPTIMIZED CHANNEL QUALITY ESTIMATION

TECHNICAL FIELD

Embodiments described herein relate generally to communication systems, and, more particularly, to link quality control in a wireless communication system.

BACKGROUND

Wireless communication networks facilitate communications with mobile or wireless user devices (often referred to as mobile subscribers, remote stations, or terminals). User devices may include cordless phones, cellular phones, satellite phones, pagers, computers, personal digital assistants (PDAs), entertainment devices, combined function devices, etc. Wireless network equipment (e.g., base stations) and user devices have been modified to use feedback information provided by the user devices to adjust future communications with the user devices in order to improve quality and throughput. One type of feedback information that is often used is referred to as channel quality (e.g., channel quality indication or index (CQI)), and may include information regarding the quality of the transmission channel. A user device measures the channel quality and provides feedback information to network equipment (e.g., via a reverse link). The network equipment (e.g., a base station) uses the feedback information for many purposes, such as selecting to which user device to transmit data (e.g., channel-dependent scheduling), selecting a transport format for user device (e.g., link adaptation), power-setting (e.g., a type of link adaptation), etc.

Link adaptation (or link quality control) is a well-known technique for adjusting transmission parameters (e.g., modulation, coding, transport block size, output power, etc.) to optimize use of a communication channel in terms of data throughput, delay, bit or block error rates, speech quality, or other performance measures. In order to perform link adaptation, feedback information about the communication channel (e.g., as experienced by a receiving device, such as a user device) is provided to a transmitting device (e.g., a base station providing the communication channel) on a reverse channel. Examples of such feedback information include a bit error rate, a block error rate (BLER), acknowledgement (ACK) and/or negative acknowledgement (NACK) information, power control commands, a carrier-to-interference ratio, a received signal strength, etc.

Feedback information most directly related to the channel quality (e.g., the carrier-to-interference ratio) are difficult to measure and are more uncertain than indirect feedback information, such as the block error rate. Hence, link adaptation schemes that track fast channel quality variations often use indirect feedback information to adjust direct channel quality reports, which are a primary basis for link adaptation. For example, a link adaptation scheme for high-speed downlink packet access (HSDPA) based networks may use ACK/NACK feedback information to modify CQI values (e.g., provided by channel quality reports) to achieve a specified long-term NACK rate. A link adaptation scheme for enhanced data rates for global evolution (EDGE) based networks may use ACK/NACK bit map feedback information in a similar way together with reported bit error probability (BEP) levels. Channel quality feedback information is also used for purposes other than link adaptation. For example, feedback information is used for scheduling in multi-user systems with shared resources to ensure that the shared resources are efficiently utilized. Feedback from the receiving device, such as block errors (e.g., ACK/NACK information), may be required if selective retransmissions are to be enabled.

Current mechanisms for transmitting channel quality feedback information, when fast channel variations are being tracked, have several disadvantages. First, the current mechanisms utilize substantial resources on the reverse link. Better link adaptation results and scheduling decisions are provided if more feedback information is provided. However, as more feedback information is provided, a greater burden is placed on reverse link resources (e.g., user device batteries). Thus, there is an undesirable tradeoff between link adaptation performance on a forward link and feedback information burden on the reverse link. In addition to capacity loss, a resource cost of transmitting feedback information has an adverse impact on reverse link coverage.

Current mechanisms for transmitting channel quality feedback information also scale poorly to multiple antennas, multiple data streams, and multiple frequencies, which are key features in the evolution of cellular networks (e.g., High Speed Packet Access (HSPA) and Long-Term Evolution (LTE) networks). Thus, current mechanisms for transmitting channel quality feedback information may place an unreasonable burden on both reverse link resources and scheduling and link adaptation processing in future networks.

When periodic reporting is used for providing channel quality feedback information (e.g., in HSDPA based networks), current mechanisms fail to provide a dynamic connection between the amount of generated channel feedback information and a need for such feedback information at the transmitting device. Attempts to address this disadvantage (e.g., with current mechanisms) by reducing the amount of generated channel feedback information negatively impacts link adaptation and scheduling performance.

SUMMARY

It is an object of the invention to overcome at least some of the above disadvantages and to provide a channel quality estimate that optimizes use of reverse link resources.

Embodiments described herein may provide systems and/or methods that provide a channel quality estimate that optimizes use of reverse link resources. For example, in one embodiment, the systems and/or methods may combine an implicit channel quality estimate (e.g., based on information transmitted on a reverse link, such as block error feedback information) with specific event-triggered channel quality reports. The block error information may need to be transmitted on the reverse link (e.g., by a receiving device, such as a user device) to enable selective retransmissions (e.g., by a transmitting device, such as a base station). The systems and/or methods may use the block error information to calculate the implicit channel quality estimate, and may regulate the implicit channel quality estimate towards a specific block error rate target. In one example, the systems and/or methods may utilize a control algorithm that tracks channel quality variations and reduces a need for the event-triggered channel quality reports. The systems and/or methods may trigger the channel quality reports when necessary (e.g., when data is waiting to be transmitted by the transmitting device but the block error information is missing, when data is waiting to be transmitted by the transmitting device but recent feedback information is missing, during large and rapid changes in channel conditions, etc.). The systems and/or methods may trigger the channel quality reports if the receiving device has enough resources available to transmit information back to the transmitting device without jeopardizing a session. The systems and/or methods may combine the channel quality measures, and may use them for transport format selection, scheduling, etc. Such an arrangement may provide a channel quality estimate, and may optimize use of reverse link resources by minimizing a need for the event-triggered channel quality reports.

In one embodiment, the systems and/or methods may transmit data via a data channel, and may either receive feedback information associated with the data channel or fail to receive feedback information associated with the data channel. The systems and/or methods may generate a trigger requesting one or more channel quality reports when the feedback information is not received, and may receive the one or more requested channel quality reports. The systems and/or methods may determine if conditions of the data channel are changing, and may generate the trigger requesting the one or more channel quality reports if the conditions of the data channel are changing. If the conditions of the data channel are not changing, the systems and/or methods may calculate an implicit channel quality estimate based on the feedback information, and may calculate a channel quality based on the implicit channel quality estimate and/or the one or more requested channel quality reports.

DETAILED DESCRIPTION

The following detailed description refers to the accompanying drawings. The same reference numbers in different drawings may identify the same or similar elements. Also, the following detailed description does not limit the invention.

Embodiments described herein may provide systems and/or methods that provide a channel quality estimate that optimizes use of reverse link resources by combining an implicit channel quality estimate with specific event-triggered channel quality reports.

Figure 1:
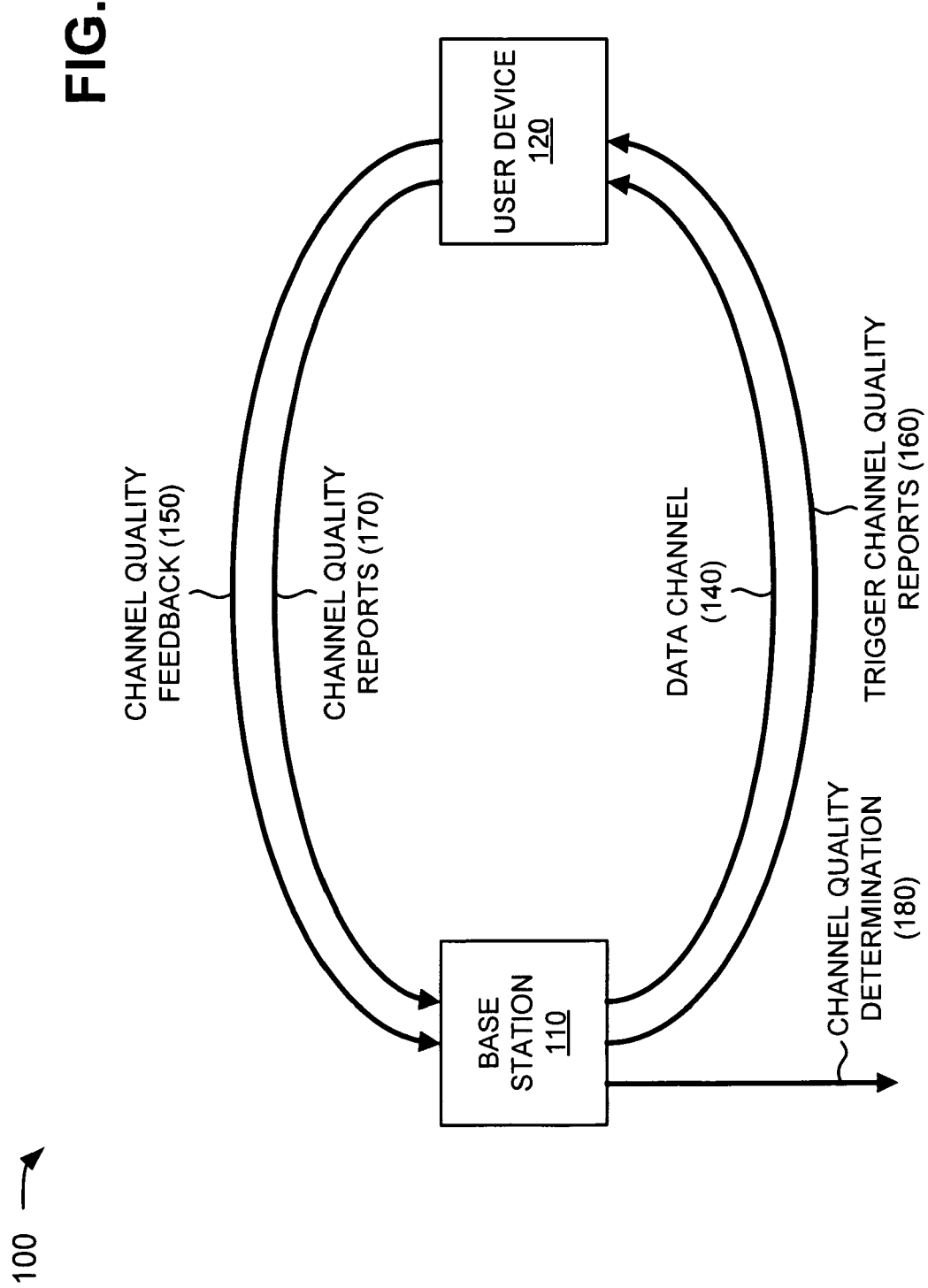
FIG. 1 depicts a diagram of an exemplary network in which systems and/or methods described herein may be implemented.

FIG. 1 depicts a diagram of an exemplary network 100 in which systems and/or methods described herein may be implemented. As illustrated, network 100 may include a base station 110 and a user device 120. A single base station 110 and user device 120 have been illustrated in FIG. 1 for simplicity. In practice, there may be more base stations 110 and/or user devices 120. Also, in some instances, base station 110 may perform one or more other functions described as being performed by user device 120, and user device 120 may perform one or more other functions described as being performed by base station 110.

Base station 110 may include one or more devices that receive voice and/or data (e.g., from radio network controllers) and transmit that voice and/or data to user device 120 via an air interface. Base station 110 may transmit and/or receive communications or signals (e.g., telephone calls, text or image messaging, Internet browsing, gaming, paging, or other data communications) to and/or from user device 120. Each communication received by base station 110 may be processed within base station 110. Base station 110 may communicate with one or more user devices 120. In one exemplary embodiment, base station 110 may calculate a channel quality estimate that optimizes use of reverse link resources in a manner described herein. Further details of base station 110 are provided below in connection with, for example, FIGS. 3, 4, and 6.

User device 120 may include one or more devices, such as a telephone, a wireless phone (e.g., providing Internet-based applications, such as a Wireless Application Protocol (WAP) application), a personal computer, a PDA, a laptop, a cordless phone, a cellular phone, a satellite phones, a pager, an entertainment device, a combined function device, or another type of computation or communication device, a thread or process running on one of these devices, and/or an object executable by one of these devices. In one exemplary embodiment, user device 120 may provide a channel quality estimate that optimizes use of reverse link resources in a manner described herein. Further details of user device 120 are provided below in connection with, for example, FIGS. 7 and 8.

In operation and as further shown in FIG. 1, base station 110 may establish a data channel (or link) 140 with user device 120. Data channel 140 may enable base station 110 to transmit and/or receive communications or signals (e.g., telephone calls, text or image messaging, Internet browsing, gaming, paging, or other data communications) to and/or from user device 120. In one exemplary embodiment, data channel 140 may include a common pilot channel (CPICH), a data channel (e.g., a high-speed downlink shared channel (HS-DSCH)), a control channel (e.g., a high speed downlink shared channel (HS-SCCH)), etc. User device 120 may monitor a quality of data channel 140, and may generate channel quality feedback information 150 based on the monitoring of data channel 140. Feedback information 150 may include an acknowledgement (ACK), a negative acknowledgement (NACK), a channel quality indication (CQI), a discontinuous transmission (DTX) bit, a block error rate (BLER), an average number of transmissions, a bit error rate, a power control command, a carrier-to-interference ratio, a received signal strength, or other communication metrics.

Base station 110 may either receive channel quality feedback information 150 (e.g., via a reverse channel or link provided between base station 110 and user device 120) or may fail to receive channel quality feedback information 150. If base station 110 receives channel quality feedback information 150, base station 110 may determine whether conditions in data channel 140 are changing (e.g., more or less than a specified threshold). If conditions in data channel 140 are changing, base station 110 may generate a trigger 160 requesting one or more channel quality reports, and may provide trigger 160 to user device 120. User device 120 may receive trigger 160, and may generate one or more channel quality reports 170 based on trigger 160. User device 120 may provide one or more channel quality reports 170 to base station 110. If conditions in data channel 140 are not changing, base station 110 may calculate an implicit channel quality estimate based on channel quality feedback information 150.

If base station 110 fails to receive channel quality feedback information 150, base station 110 may generate trigger 160 requesting one or more channel quality reports, and may provide trigger 160 to user device 120. User device 120 may receive trigger 160, and may generate one or more channel quality reports 170 based on trigger 160. User device 120 may provide one or more channel quality reports 170 to base station 110.

Alternatively and/or additionally, user device 120 may autonomously generate a trigger requesting generation of one or more channel quality reports when channel quality changes (e.g., more or less than a specified threshold). If channel quality is changing, user device 120 may determine if availability conditions of one or more reverse link resources are above a specified threshold. If the availability conditions are above a specified threshold, user device 120 may generate one or more channel quality reports (e.g., reports 170), and may provide one or more channel quality reports 170 to base station 110. For example, if the availability conditions are below the specified threshold, user device 120 may prevent generation of the one or more quality reports 170 to converse resources. If the availability conditions are above the specified threshold, user device 120 may generate one or more channel quality reports 170.

Base station 110 may determine a channel quality 180 based on the implicit channel quality estimate, one or more channel quality reports 170, or a combination of the implicit channel quality estimate and one or more channel quality reports 170. Base station 110 may utilize channel quality 180 for adjusting transmission parameters (e.g., modulation, coding, transport block size, output power, etc.) to optimize use of data channel 140 in terms of data throughput, delay, bit or block error rates, speech quality, or other performance measures.

Figure 2:
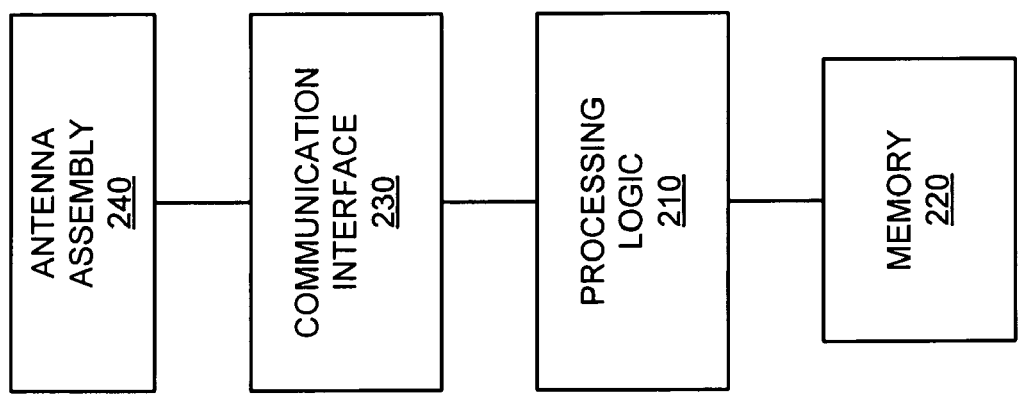
FIG. 2 illustrates exemplary components of a base station and/or a user device of the network depicted in FIG. 1.

FIG. 2 is an exemplary diagram of a device 200 that may correspond to base station 110 and/or user device 120. As illustrated, device 200 may include processing logic 210, memory 220, a communication interface 230, and/or an antenna assembly 240. Processing logic 210 may include a processor, microprocessor, an application specific integrated circuit (ASIC), field programmable gate array (FPGA), or the like. Processing logic 210 may control operation of device 200 and its components. Memory 220 may include a random access memory (RAM), a read only memory (ROM), and/or another type of memory to store data and instructions that may be used by processing logic 210.

Communication interface 230 may include, for example, a transmitter that may convert baseband signals from processing logic 210 to radio frequency (RF) signals and/or a receiver that may convert RF signals to baseband signals. Alternatively, communication interface 230 may include a transceiver to perform functions of both a transmitter and a receiver. Communication interface 230 may connect to antenna assembly 240 for transmission and/or reception of the RF signals.

Antenna assembly 240 may include one or more antennas to transmit and/or receive RF signals over the air. Antenna assembly 240 may, for example, receive RF signals from communication interface 230 and transmit them over the air and receive RF signals over the air and provide them to communication interface 230. In one implementation, for example, communication interface 230 may communicate with a network.

As described herein, device 200 may perform certain operations in response to processing logic 210 executing software instructions of an application contained in a computer-readable medium, such as memory 220. A computer-readable medium may be defined as a physical or logical memory device. The software instructions may be read into memory 220 from another computer-readable medium or from another device via communication interface 230. The software instructions contained in memory 220 may cause processing logic 210 to perform processes described herein. Alternatively, hardwired circuitry may be used in place of or in combination with software instructions to implement processes described herein. Thus, embodiments described herein are not limited to any specific combination of hardware circuitry and software.

In one exemplary embodiment, if device 200 corresponds to user 120, device may include mechanisms for inputting information to device 200 and/or for outputting information from device 200. Examples of input and output mechanisms might include buttons, a keyboard, a mouse, a pen, a microphone, voice recognition and/or biometric mechanisms, a display, a printer, a speaker, etc.

Although FIG. 2 shows exemplary components of device 200, in other embodiments, device 200 may contain fewer, different, or additional components than depicted in FIG. 2. In still other embodiments, one or more components of device 200 may perform one or more other tasks described as being performed by one or more other components of device 200.

Figure 3:
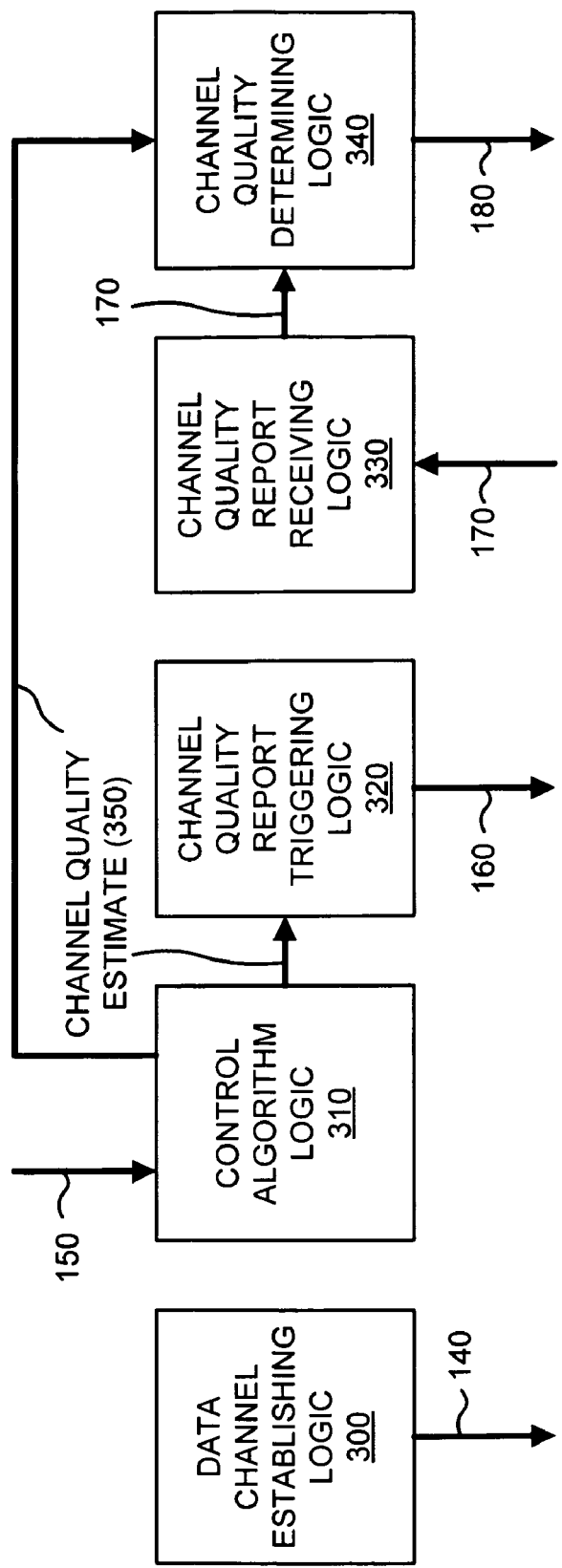
FIG. 3 depicts a diagram of exemplary functional components of the base station of the network illustrated in FIG. 1.

FIG. 3 depicts a diagram of exemplary functional components of base station 110. As illustrated, base station 110 may include data channel establishing logic 300, control algorithm logic 310, channel quality report triggering logic 320, channel quality report receiving logic 330, and channel quality determining logic 340. The functions described in FIG. 3 may be performed by one or more of the exemplary components of device 200 depicted in FIG. 2.

Data channel establishing logic 300 may include any hardware and/or software based logic (e.g., processing logic 210) that enables base station 110 to establish a data channel (e.g., data channel 140) for communication with a user device (e.g., user device 120). Base station 110 may transmit communications or signals (e.g., telephone calls, text or image messaging, Internet browsing, gaming, paging, or other data communications) to user device 120 via data channel 140.

Control algorithm logic 310 may include any hardware and/or software based logic (e.g., processing logic 210) that enables base station 110 to receive channel quality feedback (e.g., channel quality feedback information 150 from user device 120), and to generate a channel quality estimate 350 based on the channel quality feedback information 150. In one embodiment, channel quality feedback information 150 may include ACK/NACK reports received from user device 120, and control algorithm logic 310 may calculate channel quality estimate 350 based on the ACK/NACK reports. In one example, control algorithm logic 310 may calculate channel quality estimate 350 by increasing or decreasing a current channel quality estimate 350 whenever an ACK or a NACK is received by base station 110. Control algorithm logic 310 may set a ratio between increase and decrease steps in order reach a specified BLER target. In other examples, control algorithm logic 310 may calculate channel quality estimate 350, based on ACK/NACK information, using other control algorithms.

In one exemplary embodiment, control algorithm logic 310 may utilize a control algorithm that calculates a channel quality estimate (Q) for a current time period or step (k). Depending on whether ACK, NACK, or nothing is received (e.g., by base station 110) in a current step and given a channel quality estimate in a previous step (e.g., Q(k−1)), control algorithm logic 310 may determine a new value for channel quality estimate (Q) as follows:

$$\begin{aligned}&\text{if ACK}\\&\quad Q(k) = Q(k-1) + \Delta_{up}\\&\text{elseif NACK}\\&\quad Q(k) = Q(k-1) - \Delta_{down},\\&\text{else}\\&\quad Q(k) = Q(k-1)\\&\text{endif}\end{aligned}$$

where $$\Delta_{down} = \left\lceil \Delta_{up} \cdot \frac{(1 - BLER_{target})}{BLER_{target}} \right\rceil, \Delta_{down} \geq 0, \Delta_{up} \geq 0,$$

refers to rounding up to the nearest integer, $BLER_{target}$ refers to a specified BLER target, $\Delta_{down}$ refers to a decrease step, and $\Delta_{up}$ refers to an increase step.

As further shown in FIG. 3, control algorithm logic 310 may provide channel quality estimate 350 to channel quality report triggering logic 320 and channel quality determining logic 340. Further details of control algorithm logic 310 are provided below in connection with, for example, FIG. 4.

Channel quality report triggering logic 320 may include any hardware and/or software based logic (e.g., processing logic 210) that enables base station 110 to generate a trigger (e.g., trigger 160) requesting channel quality reports (e.g., from user device 120). In one embodiment, channel quality report triggering logic 320 may receive channel quality estimate 350 from control algorithm logic 310, and may determine whether to generate trigger 160 requesting channel quality reports based on channel quality estimate 350 and/or based on whether base station 110 fails to receive channel quality feedback information 150. Further details of control algorithm logic 310 are provided below in connection with, for example, FIG. 6.

Channel quality report receiving logic 330 may include any hardware and/or software based logic (e.g., processing logic 210) that enables base station 110 to receive channel quality reports (e.g., channel quality reports 170) from user device 120. In one embodiment, channel quality report receiving logic 330 may receive channel quality reports 170 from user device 120, and may provide channel quality reports 170 to channel quality determining logic 340.

Channel quality determining logic 340 may include any hardware and/or software based logic (e.g., processing logic 210) that enables base station 110 to determine a channel quality (e.g., channel quality 180) associated with a data channel (e.g., data channel 140). In one embodiment, channel quality determining logic 340 may receive channel quality reports 170 from channel quality report receiving logic 330 and channel quality estimate 350 from control algorithm logic 310, and may determine channel quality 180 based on channel quality reports 170, channel quality estimate 350, or a combination of channel quality reports 170 and channel quality estimate 350. Base station 110 may utilize channel quality 180 for adjusting transmission parameters (e.g., modulation, coding, transport block size, output power, etc.) to optimize use of data channel 140 in terms of data throughput, delay, bit or block error rates, speech quality, or other performance measures.

Although FIG. 3 shows exemplary functional components of base station 110, in other embodiments, base station 110 may contain fewer, different, or additional components than depicted in FIG. 3. In still other embodiments, one or more functional components of base station 110 may perform one or more other tasks described as being performed by one or more other functional components of base station 110.

Figure 4:
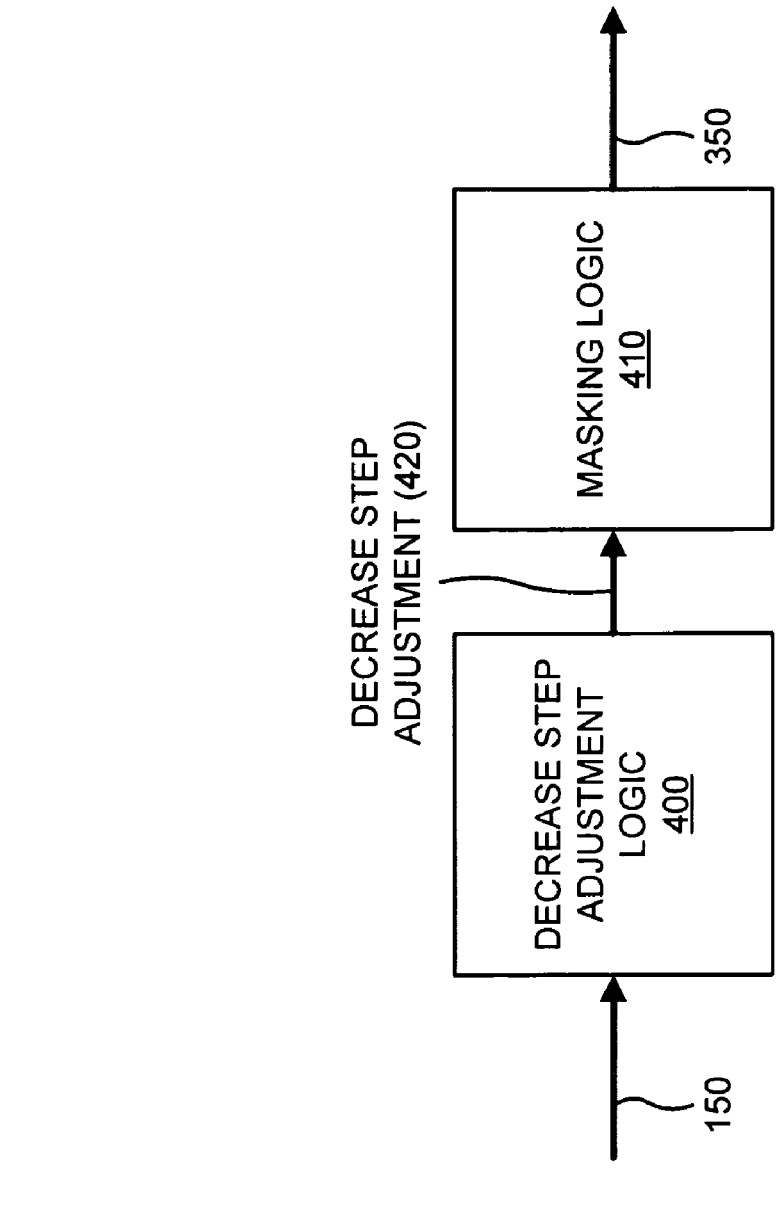
FIG. 4 illustrates a diagram of exemplary functional components of control algorithm logic of the base station depicted in FIG. 3.

FIG. 4 illustrates a diagram of exemplary functional components of control algorithm logic 310 of base station 110. As illustrated, control algorithm logic 310 may include decrease step adjustment logic 400 and masking logic 410. A decrease step ($\Delta_{down}$) may be much larger than an increase step ($\Delta_{up}$) in the exemplary control algorithm described above in connection with FIG. 3. This may contrast with real channel quality, which may decrease at a similar speed as it increases. Accordingly, decrease adjustment logic 400 and masking logic 410 may be included in control algorithm logic 310 to obtain a more symmetric and/or stable behavior for channel quality estimate 350. The functions described in FIG. 4 may be performed by one or more of the exemplary components of device 200 depicted in FIG. 2.

Decrease step adjustment logic 400 may include any hardware and/or software based logic (e.g., processing logic 210) that enables control algorithm logic 310 to receive channel quality feedback information 150 (e.g., from user device 120), and to generate a decrease step adjustment 420 based on channel quality feedback information 150 and a decrease step adjustment algorithm, described below. In one exemplary embodiment, decrease step adjustment logic 400 may not adjust the increase step ($\Delta_{up}$), but may modify the decrease step ($\Delta_{down}$) (e.g., decrease adjustment step 420) each time a NACK report is received (e.g., from user device 120 via channel quality feedback information 150) based on a number of consecutive ACK reports received (e.g., from user device 120 via channel quality feedback information 150) since a last NACK report. This may enable the exemplary control algorithm, described above in connection with FIG. 3, to be dependent on a channel quality level and may permit smaller jumps to be taken downwards if the channel quality is increasing (e.g., based on channel quality feedback information 150).

For example, assume that a number ($N_{ACK}$) of consecutive ACK reports have been received between two NACK reports. Consistent with the control algorithm, described above in connection with FIG. 3, $$N_{mean} = \left\lceil \frac{1 - BLER_{target}}{BLER_{target}} \right\rceil$$

may be an approximate mean number of ACK reports to be received over time. Each time a NACK report is received, decrease step adjustment logic 400 may adjust the decrease step ($\Delta_{down}$) (e.g., decrease adjustment step 420) as follows:

$$\text{if } (N_{ACK} - N_{mean}) > \alpha$$
$$\Delta_{down} = \Delta_{down} - \beta \cdot \frac{|N_{ACK} - N_{mean}|}{N_{mean}}$$
$$\text{elseif } (N_{ACK} - N_{mean}) < -\alpha$$
$$\Delta_{down} = \Delta_{down} + \beta \cdot \frac{|N_{ACK} - N_{mean}|}{N_{mean}}$$
endif where $\alpha \geq 0$ refers to setting a margin for how much channel quality should differ from the mean for a decrease step correction to be applied, and $\beta \geq 0$ refers to controlling a correction size. With this exemplary algorithm (e.g., provided by decrease step adjustment logic 400), a smaller step down may be taken after a long sequence of consecutive ACK reports and the step may be increased if many short sequences of consecutive ACK reports are observed.

Masking logic 410 may include any hardware and/or software based logic (e.g., processing logic 210) that enables control algorithm logic 310 to receive decrease step adjustment 420 from decrease step adjustment logic 400, and to generate channel quality estimate 350 based on decrease step adjustment 420 and a masking algorithm, described below. In one exemplary embodiment, masking logic 410 may implement a masking algorithm that maintains channel quality estimate 350 for a specified time if two or more consecutive NACK reports are received (e.g., via channel quality feedback information 150). This may permit any action taken on the first NACK report to have an effect before action is taken on the second NACK report.

In one embodiment, the masking algorithm provided by masking logic 410 may calculate the channel quality estimate (Q) (e.g., channel quality estimate 350), each time a NACK has been received, as follows:

```
if NACK and ((previous report an ACK) or
      (previous report a NACK and masking_time == T_hold))
   Q(k) = Q(k - 1) - Δ_down
   masking _ time = 0
elseif NACK and previous report a NACK and masking_time < T_hold ,
   Q(k) = Q(k - 1)
   masking _ time = masking _ time + 1
endif
``` where $T_{hold}$ refers to a specified masking time, and (masking_time=0) refers to a default value for a variable.

Although FIG. 4 shows exemplary functional components of control algorithm logic 310, in other embodiments, control algorithm logic 310 may contain fewer, different, or additional components than depicted in FIG. 4. In still other embodiments, one or more functional components of control algorithm logic 310 may perform one or more other tasks described as being performed by one or more other functional components of control algorithm logic 310.

Figure 5:
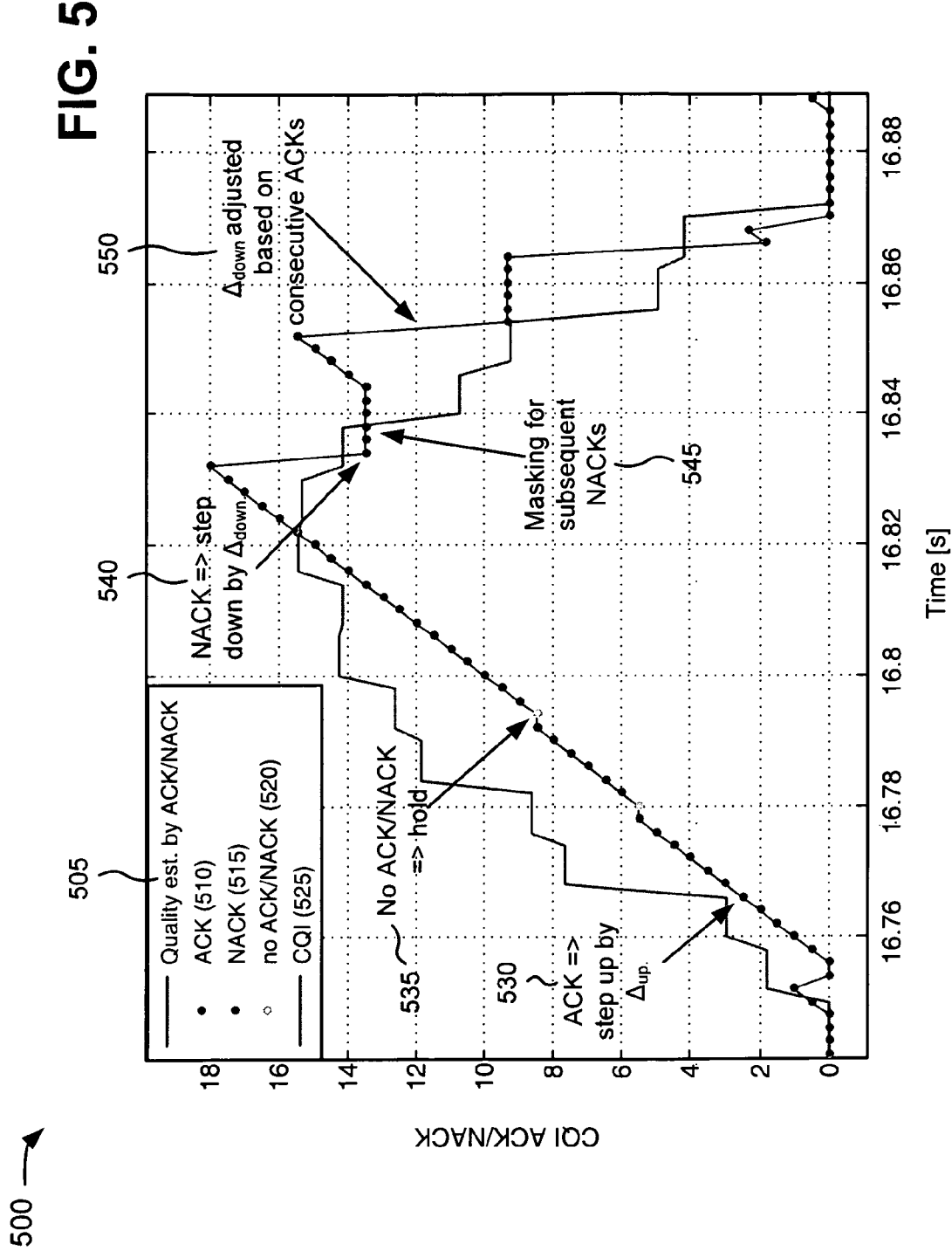
FIG. 5 depicts a diagram of an exemplary channel quality estimate capable of being generated by the base station illustrated in FIG. 3.

FIG. 5 depicts a diagram 500 of an exemplary channel quality estimate capable of being generated by base station 110. As illustrated, a channel quality estimate 505 may be generated by base station 110 based on ACK reports 510, NACK reports 515, and/or omission of ACK/NACK reports 520. In one embodiment, channel quality estimate 505 may be generated by control algorithm logic 310 in conjunction with the algorithm modifications provided by decrease step adjustment logic 400 and masking logic 410. CQI 525 may represent a CQI value that would have been generated in accordance with conventional link adaptation techniques.

The exemplary parameters used to generate channel quality estimate 505 may include $BLER_{target}=0.1$, $\alpha=1$, $\beta=1$, $T_{hold}=5$ TTI's. A step size may be controlled by a BLER target (e.g., $BLER_{target}$), and may be further adjusted based on a number of consecutive ACK reports. Masking may be used for consecutive NACK reports.

As further shown in FIG. 5, receipt of an ACK report 530 (e.g., by base station 110) may cause channel quality estimate 505 to increase (or step up) by an increase step ($\Delta_{up}$). An omission of an ACK/NACK report 535 (e.g., no ACK or NACK report is received by base station 110) may cause channel quality estimate 505 to hold at a certain level for a specified time period. Receipt of a NACK reports 540 (e.g., by base station 110) may cause channel quality estimate 550 to decrease (or step down) by a decrease step ($\Delta_{down}$). Channel quality estimate 505 may be held at a certain level for a specified time period if subsequent NACK reports 545 are received (e.g., by base station 110). Receipt of consecutive ACK reports 550 may cause the decrease step ($\Delta_{down}$) to be adjusted.

Figure 6:
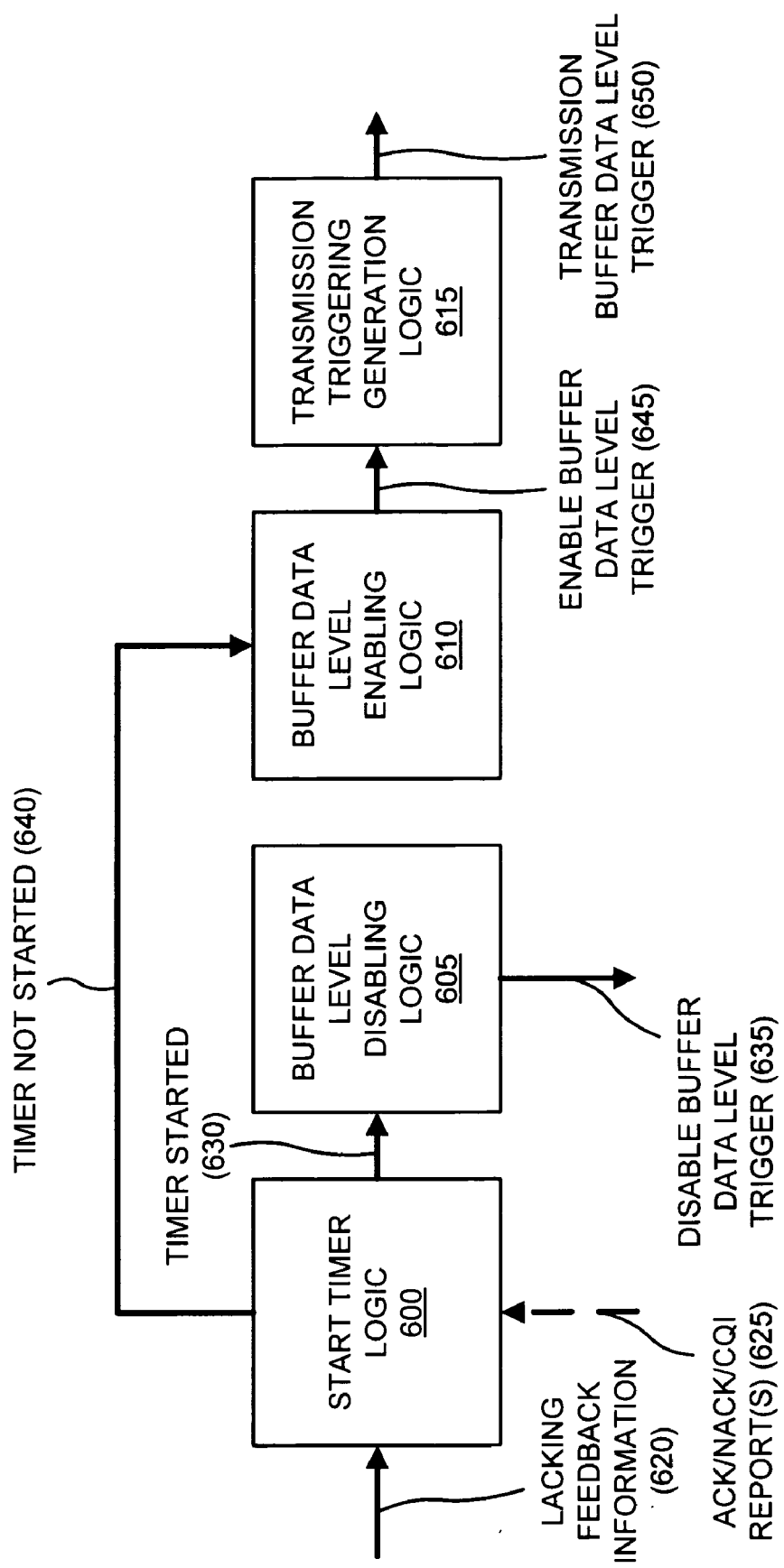
FIG. 6 illustrates a diagram of exemplary functional components of channel quality report triggering logic of the base station depicted in FIG. 3.

FIG. 6 illustrates a diagram of exemplary functional components of channel quality report triggering logic 320 of base station 110. As illustrated, channel quality report triggering logic 320 may include start timer logic 600, buffer data level disabling logic 605, buffer data level enabling logic 610, and transmission triggering generation logic 615. The functions described in FIG. 6 may be performed by one or more of the exemplary components of device 200 depicted in FIG. 2.

Although an exemplary control algorithm of the type described above in connection with FIGS. 3 and 4 may be successful in following channel quality variations in many cases, there may be occasions when direct channel quality reporting may be necessary to achieve adequate data channel 140 performance. This may occur, for example, if ACK/NACK information is lacking or missing at a start of data transmission, or during large and rapid changes in channel quality due to user mobility (e.g., in an urban environment). In one embodiment, base station 110 may combine the exemplary control algorithm, described above in connection with FIGS. 3 and 4, with event-triggered channel quality reporting in order to achieve an acceptable data channel 140 performance.

Start timer logic 600 may include any hardware and/or software based logic (e.g., processing logic 210) that enables channel quality report triggering logic 320 to receive an indication 620 that feedback information (e.g., ACK/NACK/CQI reports 625) is lacking. In one exemplary embodiment, a data level in a forward link (e.g., data channel 140) transmission buffer (e.g., provided in base station 110) may be used to trigger one or more direct channel quality reports if recent ACK/NACK or CQI information (e.g., reports) is lacking. This may be achieved by base station 110 polling user device 120 to send such reports. To determine what may be recent, a timer could be started in base station 110 (e.g., by start timer logic 600) after reception of each ACK/NACK or CQI report, and a timer started signal 630 may be generated by start timer logic 600. If feedback information (e.g., ACK/NACK/CQI reports 625) is not received by start timer logic 600, start timer logic 600 may not start the timer, as indicated by reference number 640.

Buffer data level disabling logic 605 may include any hardware and/or software based logic (e.g., processing logic 210) that enables channel quality report triggering logic 320 to receive timer started signal 630, and to disable a buffer data level trigger, as indicated by reference number 635. In one exemplary embodiment, while the timer is running, buffer data level disabling logic 605 may disable buffer data level as a trigger for polling for direct channel quality reports from user device 120.

Buffer data level enabling logic 610 may include any hardware and/or software based logic (e.g., processing logic 210) that enables channel quality report triggering logic 320 to receive timer not started signal 640, and to enable the buffer data level trigger, as indicated by reference number 645. In one embodiment, while the timer is not running, buffer data level enabling logic 610 may enable buffer data level as a trigger for polling for direct channel quality reports from user device 120.

In one exemplary embodiment, buffer data level disabling logic 605 and/or buffer data level enabling logic 610 may perform the aforementioned functions based on the following exemplary algorithm:

```
if N_buffer ≥ N_poll
    if ACK or NACK or CQI
        time_since_report = 0
    elseif time_since_report == T_poll
        poll CQI ,
    elseif time_since_report < T_poll
        time_since_report = time_since_report + 1
    endif
endif
``` where $N_{buffer}$ refers to a number of bits in the transmission buffer, $N_{poll}$ refers to a buffer level threshold for starting a poll timer, $T_{poll}$ refers to a CQI poll timer threshold, and (time_since_report=$T_{poll}$) refers to a default value for a variable. In one example, the values of $T_{poll}$ and $N_{poll}$ may be configurable and $N_{poll}$ may equal zero. The polling itself (e.g., polling of user device 120 by base station 110) may, for example, be performed using a high-speed shared control channel (HS-SCCH). Alternatively and/or additionally, since data transmission triggers the ACK/NACK reports, a different timer, with a similar purpose and appropriately set to cater for a round trip time of the link, may be started each time data from the transmission buffer is transmitted to user device 120.

Transmission triggering generation logic 615 may include any hardware and/or software based logic (e.g., processing logic 210) that enables channel quality report triggering logic 320 to receive enable buffer data level trigger 645 from buffer data level enabling logic 610, and to generate a transmission buffer data level trigger 650 based on the received information.

Although FIG. 6 shows exemplary functional components of channel quality report triggering logic 320, in other embodiments, channel quality report triggering logic 320 may contain fewer, different, or additional components than depicted in FIG. 6. In still other embodiments, one or more functional components of channel quality report triggering logic 320 may perform one or more other tasks described as being performed by one or more other functional components of channel quality report triggering logic 320.

Figure 7:
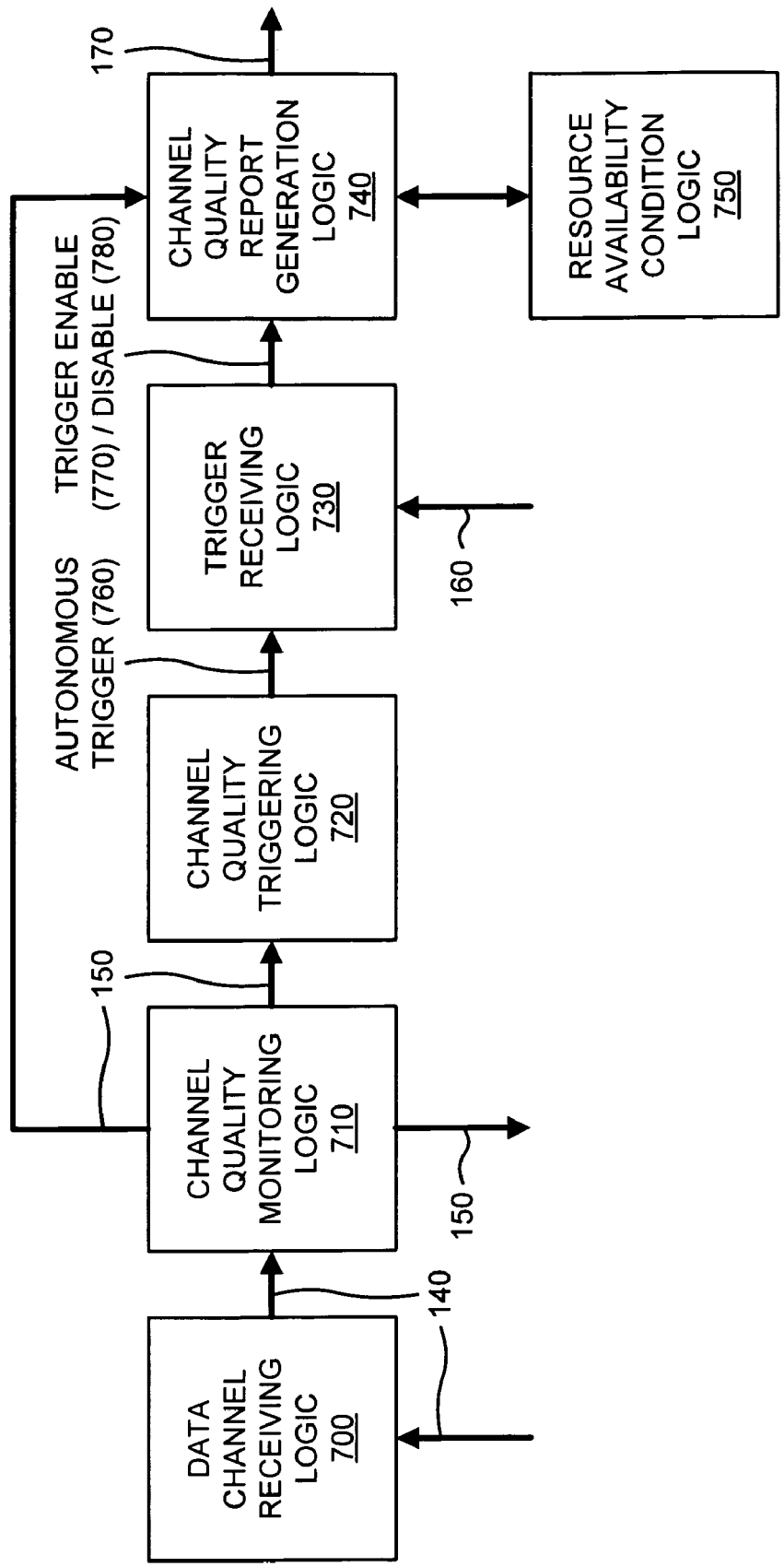
FIG. 7 depicts a diagram of exemplary functional components of the user device of the network illustrated in FIG. 1.

FIG. 7 depicts a diagram of exemplary functional components of the user device 120. As illustrated, user device 120 may include data channel receiving logic 700, channel quality monitoring logic 710, channel quality triggering logic 720, trigger receiving logic 730, channel quality report generation logic 740, and resource availability condition logic 750. The functions described in FIG. 7 may be performed by one or more of the exemplary components of device 200 depicted in FIG. 2.

Data channel receiving logic 700 may include any hardware and/or software based logic (e.g., processing logic 210) that enables user device 120 to receive data via a data channel (e.g., data channel 140 from base station 110), and to provide information relating to data channel 140 to channel quality monitor logic 710.

Channel quality monitoring logic 710 may include any hardware and/or software based logic (e.g., processing logic 210) that enables channel quality monitoring logic 710 to receive information relating to data channel 140 from data channel receiving logic 700, to monitor information relating to data channel 140, and to generate channel quality feedback information (e.g., channel quality feedback information 150) based on the monitoring of information relating to data channel 140. Channel quality monitoring logic 710 may provide channel quality feedback information 150 to base station 110 (e.g., via a reverse link), channel quality triggering logic 720, and channel quality report generation logic 740.

Channel quality triggering logic 720 may include any hardware and/or software based logic (e.g., processing logic 210) that enables user device 120 to generate an autonomous trigger 760 requesting generation of channel quality reports. In one embodiment, channel quality triggering logic 720 may receive channel quality feedback information 150 from channel quality monitoring logic 710, and may generate autonomous trigger 760 based on channel quality feedback information 150. In one example, channel quality triggering logic 720 may generate autonomous trigger 760 if channel quality (e.g., as provided by channel quality feedback information 150) changes by a sufficiently large amount in a sufficiently short period of time, and data is or has recently been received by user device 120. Channel quality triggering logic 720 may provide autonomous trigger 760 to trigger receiving logic 730.

In an exemplary embodiment, autonomous trigger 760 may be generated based on a running mean of the channel quality measured by user device 120 over a constant and configurable time period. If an absolute value of a change in the mean exceeds a configurable threshold (e.g., $\Delta_{transmit}$) from one measurement sample to the next, then direct channel quality reporting may be initiated. In one example (e.g., in HSDPA), autonomous trigger 760 may be generated as follows:

```
if |CQI(k) - CQI(k-1)| > Δ_transmit
    transmit CQI(k) ,
endif
``` where $$\overline{CQI(k)} = \frac{1}{n} \sum_{j=k-n+1}^{k} CQI(j)$$

refers to a running mean over the CQI measured by user device 120.

The threshold ($\Delta_{transmit}$), for example, may be expressed in decibels (dB), and an averaging period may be signalled to user device 120 by higher layer signalling. In other embodiments, different filtering methods and/or thresholds for reporting may be used to generate autonomous trigger 760. In an exemplary embodiment, base station 110 may be prepared to receive direct channel quality reports from user device 120 during, and for a configurable time period after, data transmission on data channel 140.

Trigger receiving logic 730 may include any hardware and/or software based logic (e.g., processing logic 210) that enables user device 120 to enable or disable a trigger requesting generation of channel quality reports. In one embodiment, trigger receiving logic 730 may receive autonomous trigger 760 and/or trigger 160 (e.g., from base station 110), and may generate a trigger enable signal 770 or a trigger disable signal 780. Trigger receiving logic 730 may provide trigger enable signal 770/trigger disable signal 780 to channel quality report generation logic 740. Further details of trigger receiving logic 730 are provided below in connection with, for example, FIG. 8.

Channel quality report generation logic 740 may include any hardware and/or software based logic (e.g., processing logic 210) that enables user device 120 to generate one or more channel quality reports (e.g., channel quality reports 170). In one embodiment, channel quality report generation logic 740 may receive trigger enable signal 770 from trigger receiving logic 730, and may generate channel quality reports 170 based on trigger enable signal 770. In another embodiment, channel quality report generation logic 740 may receive trigger disable signal 780, and may prevent channel quality reports 170 from being generated.

Transmitting channel quality (e.g., CQI) reports may expend resources (e.g., power) associated with user device 120. In situations where user device 120 may have limited power, generating channel quality reports may adversely affect other parts of a communication session (e.g., transmission of data and higher layer signaling) between user device 120 and base station 110. In such situations, it may be better for user device 120 to secure stable power control behavior and maintain a data and signaling connection with base station 110, rather than generating channel quality reports and risk dropping a call.

Resource availability condition logic 750 may include any hardware and/or software based logic (e.g., processing logic 210) that enables user device 120 to prevent generation of channel quality reports if a level of available resources (e.g., power) in user device 120 is below a configurable threshold limit. Resource availability condition logic 750 may communicate with channel quality report generation logic 740, and may prevent channel quality report generation logic 740 from generating channel quality reports if a level of available resources in user device 120 is below a configurable threshold limit. Resource availability condition logic 750 may permit channel quality report generation logic 740 to generate channel quality reports if a level of available resources in user device 120 is above the configurable threshold limit.

In one example, an adequate power level for feedback transmission for an exemplary user device 120 (in an HSDPA case) may be more than 50% of Dedicated Physical Control Channel (DPCCH) power. If a channel quality report is transmitted by such as user device 120, the available power for data transmission on an E-DCH Dedicated Physical Data Channel (E-DPDCH) may be reduced since the control channels may be the first to utilize power. When user device 120 has limited power, a channel quality report transmission may decrease a probability of successful E-DPDCH transmission (e.g., carrying higher layer signaling), and thereby risk dropping a connection. A failed E-DPDCH transmission may also trigger an action (e.g., from a power controller of user device 120) to further increase DPCCH power, which may result in even less available data transmission power.

Although FIG. 7 shows exemplary functional components of user device 120, in other embodiments, user device 120 may contain fewer, different, or additional components than depicted in FIG. 7. In still other embodiments, one or more functional components of user device 120 may perform one or more other tasks described as being performed by one or more other functional components of user device 120.

Figure 8:
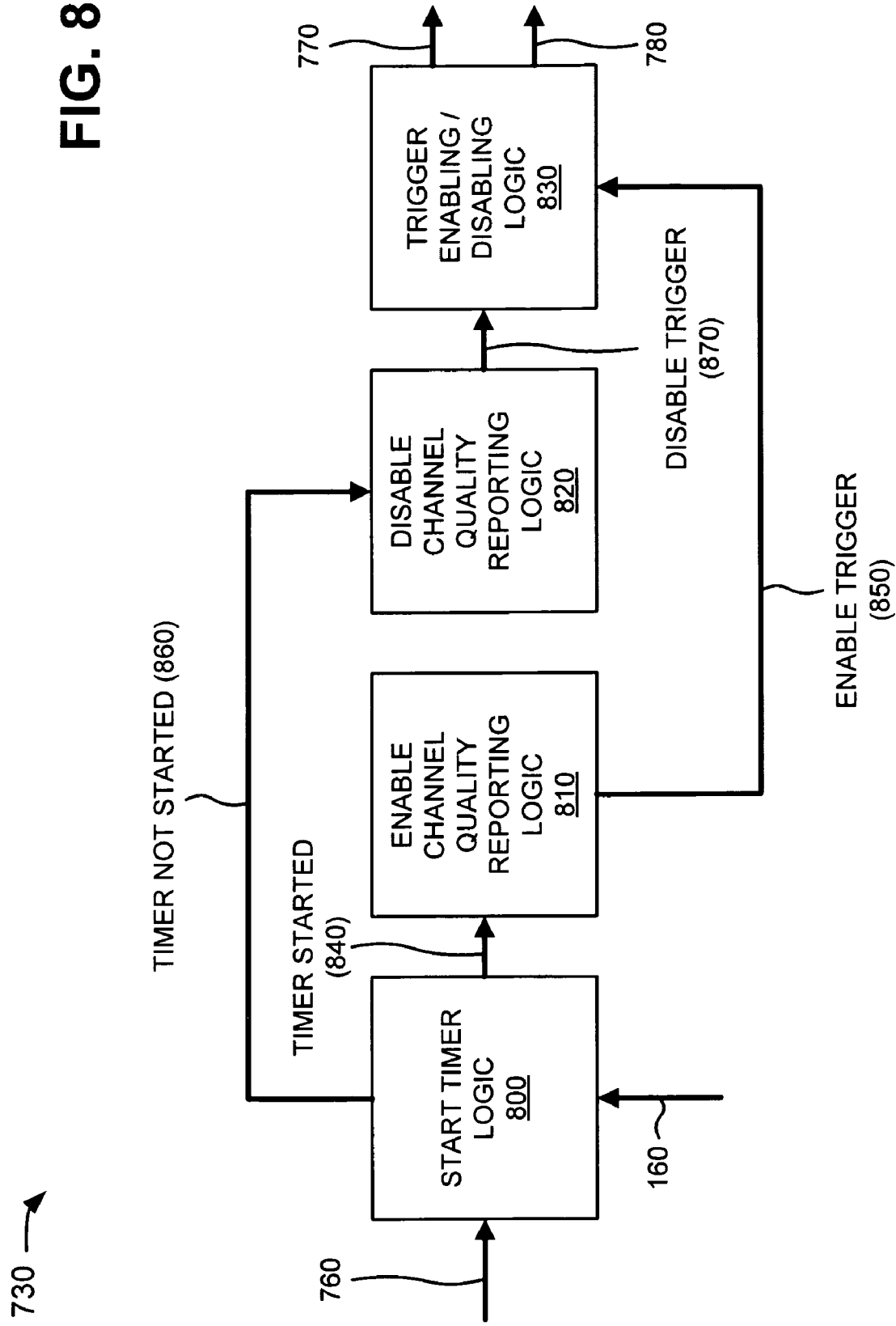
FIG. 8 illustrates a diagram of exemplary functional components of trigger receiving logic of the user device depicted in FIG. 7.

FIG. 8 illustrates a diagram of exemplary functional components of trigger receiving logic 730 of user device 120. As illustrated, trigger receiving logic 730 may include start timer logic 800, enable channel quality reporting logic 810, disable channel quality reporting logic 820, and trigger enabling/disabling logic 830. The functions described in FIG. 8 may be performed by one or more of the exemplary components of device 200 depicted in FIG. 2.

Start timer logic 800 may include any hardware and/or software based logic (e.g., processing logic 210) that enables trigger receiving logic 730 to receive autonomous trigger 760 and/or trigger 160 (e.g., from base station 110), and to start a timer, as indicated by reference number 840, based on the received information. In one exemplary embodiment, start timer logic 800 may start a configurable timer each time data is received by user device 120 (e.g., from base station 110). Start timer logic 800 may provide timer started signal 840 to enable channel quality reporting logic 810. In another embodiment, start timer logic 800 may not start the timer, as indicated by reference number 860, if data is not received by user device 120. Start timer logic 800 may provide timer not started signal 860 to disable channel quality reporting logic 820.

Enable channel quality reporting logic 810 may include any hardware and/or software based logic (e.g., processing logic 210) that enables trigger receiving logic 730 to enable a trigger 850 requesting generation of channel quality reports from user device 120. In one exemplary embodiment, enable channel quality reporting logic 810 may receive timer started signal 840 from start timer logic 800, and may enable trigger 850 based on timer started signal 840. Enable channel quality reporting logic 810 may provide enable trigger 850 to trigger enabling/disabling logic 830.

Disable channel quality reporting logic 820 may include any hardware and/or software based logic (e.g., processing logic 210) that enables trigger receiving logic 730 to disable a trigger 870 requesting generation of channel quality reports. In one embodiment, while the timer is not running (as indicated by reference number 860), disable channel quality reporting logic 820 may disable trigger 870 for requesting generation of channel quality reports from user device 120. Disable channel quality reporting logic 820 may provide disable trigger 870 to trigger enabling/disabling logic 830.

Trigger enabling/disabling logic 830 may include any hardware and/or software based logic (e.g., processing logic 210) that enables trigger receiving logic 730 to generate trigger enable signal 770 or trigger disable signal 780. In one embodiment, if trigger enabling/disabling logic 830 receives enable trigger 850, trigger enabling/disabling logic 830 may generate trigger enable signal 770. If trigger enabling/disabling logic 830 receives disable trigger 870, trigger enabling/disabling logic 830 may generate trigger disable signal 780.

Although FIG. 8 shows exemplary functional components of trigger receiving logic 730, in other embodiments, trigger receiving logic 730 may contain fewer, different, or additional components than depicted in FIG. 8. In still other embodiments, one or more functional components of trigger receiving logic 730 may perform one or more other tasks described as being performed by one or more other functional components of trigger receiving logic 730.

Figure 9:
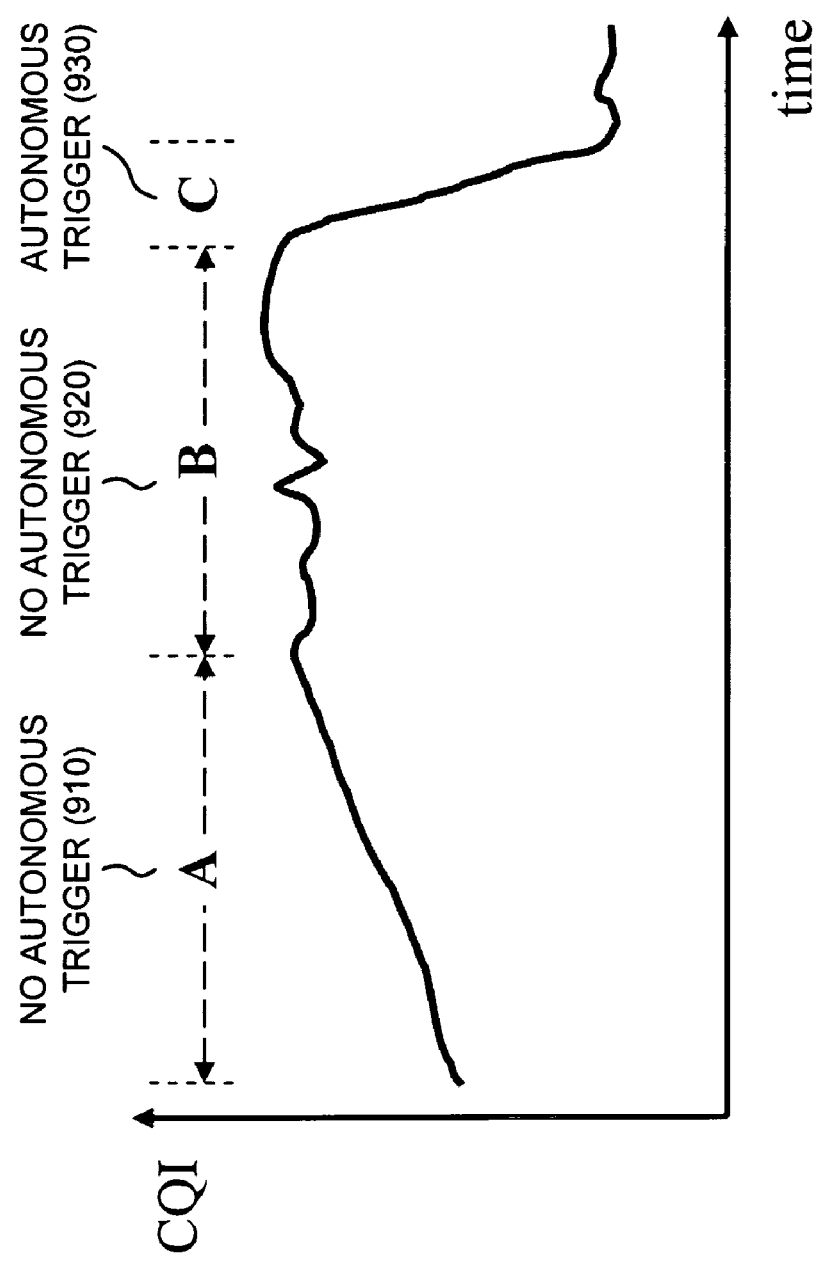
FIG. 9 depicts a diagram of exemplary channel quality information capable of being utilized by the user device illustrated in FIG. 7 for determining whether to generate an autonomous trigger.

FIG. 9 depicts a diagram 900 of exemplary channel quality information (e.g., CQI) capable of being utilized by user device 120 for determining whether to generate an autonomous trigger (e.g., autonomous trigger 760). As described above in connection with FIG. 7, autonomous trigger 760 may be generated based on large and rapid channel quality changes. As shown in FIG. 9, during a time period (A), there may be a large, but gentle increase in channel quality experienced by user device 120, and autonomous trigger 760 may not be initiated (i.e., direct channel quality reporting may not be initiated by user device 120), as indicated by reference number 910. In one embodiment, the control algorithm for autonomous trigger 760, described above in connection with FIG. 7, may monitor the channel quality change depicted for time period (A), and may not initiate autonomous trigger 760.

As further shown in FIG. 9, during a time period (B), there may be some short, sharp channel quality fluctuations, but the fluctuations magnitude may be insufficient to activate autonomous trigger 760 (i.e., direct channel quality reporting may not be initiated by user device 120), as indicated by reference number 920. Autonomous trigger 760 may not be activated because an impact of such quick, but small channel quality variations on data channel 140 performance may be relatively minor. In one embodiment, the control algorithm for autonomous trigger 760, described above in connection with FIG. 7, may monitor the channel quality change depicted for time period (B), and may not initiate autonomous trigger 760.

As still further shown in FIG. 9, during a time period (C), user device 120 may experience a rapid and large decrease in channel quality, and autonomous trigger 760 may be initiated, as indicated by reference number 930. In one embodiment, the control algorithm for autonomous trigger 760, described above in connection with FIG. 7, may monitor the channel quality change depicted for time period (C), and may initiate autonomous trigger 760. Initiation of autonomous trigger 760 may initiate generation of one or more direct channel quality reports (e.g., channel quality reports 170) by user device 120. User device 120 may provide the one or more channel quality reports to base station 110 (e.g., via a reverse link) in order to secure an appropriate and quick adjustment of data channel 140 transmission parameters.

Although embodiments described herein include triggers for generating channel quality reports, in other embodiments, other triggers may be used for generating channel quality reports. For example, triggering may be based on when reverse link data or ACK/NACK feedback is sent, on when user device 120 identifies a change in a multiple-input, multiple-output (MIMO) transmission mode (e.g., a switch from a single-stream to dual-stream transmission in HSDPA). In another example, triggering criteria may be service dependent.

In one alternative embodiment, when direct channel quality reports are received by base station 110, the control algorithm, described above in connection with FIG. 3, may be suspended and the implicit channel quality estimate may be replaced by the direct channel quality reports. In other embodiments, the direct channel quality reports and implicit channel quality estimate may be combined based on a weighting procedure. In still other embodiments, the direct channel quality reports and implicit channel quality estimate may be combined with other indications of channel quality, such as power control commands and Doppler shift estimates.

Figure 10:
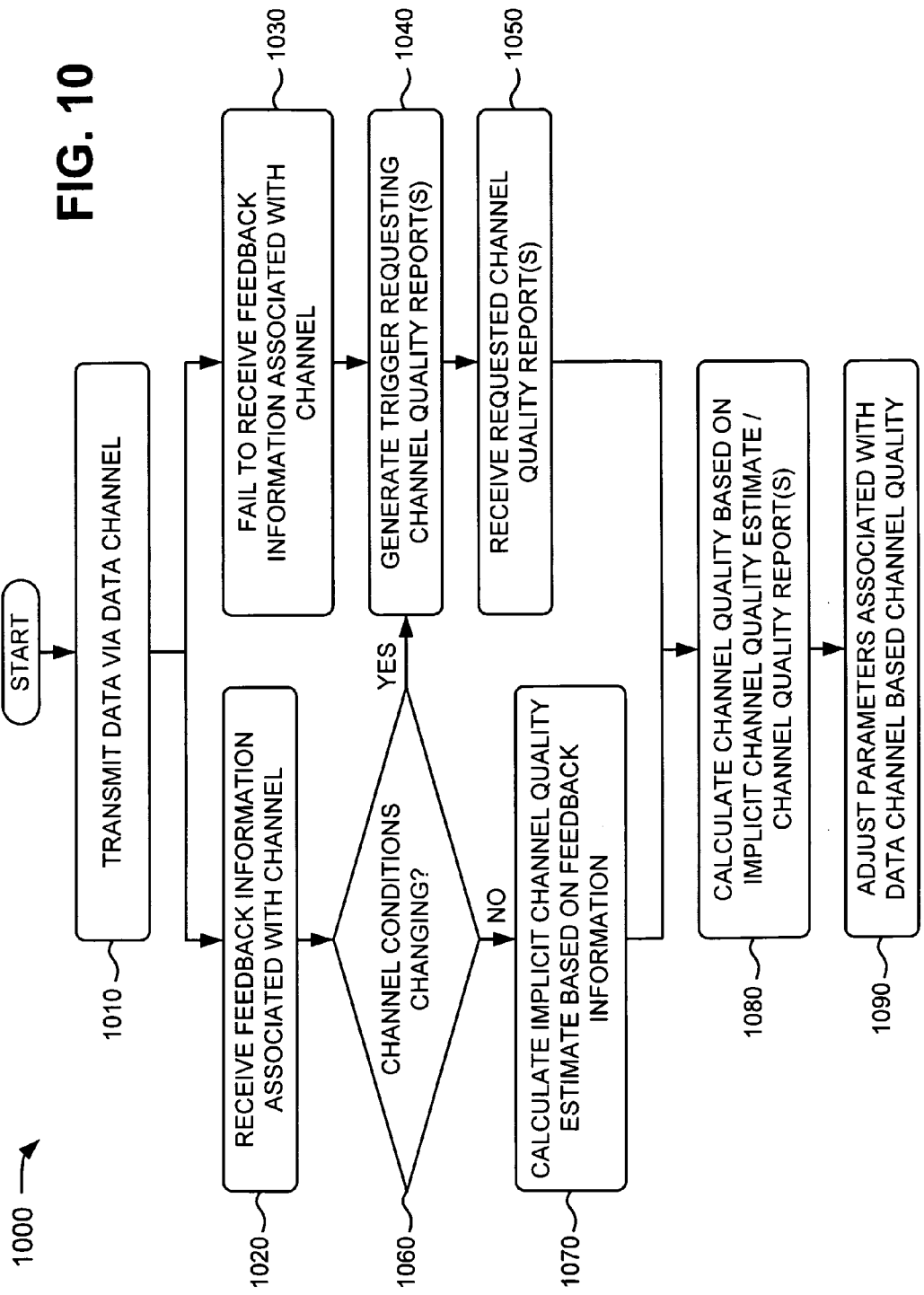
FIGS. 10-14 depict flow charts of exemplary processes for providing a channel quality estimate that optimizes use of reverse link resources according to embodiments described herein.
Figure 11:
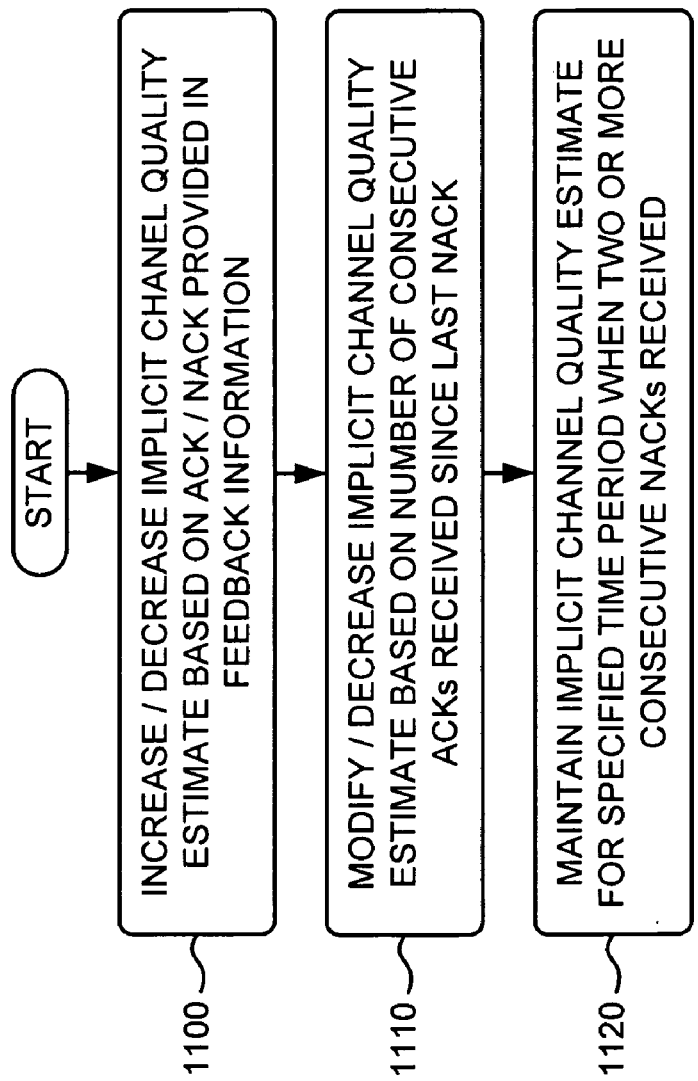
Figure 12:
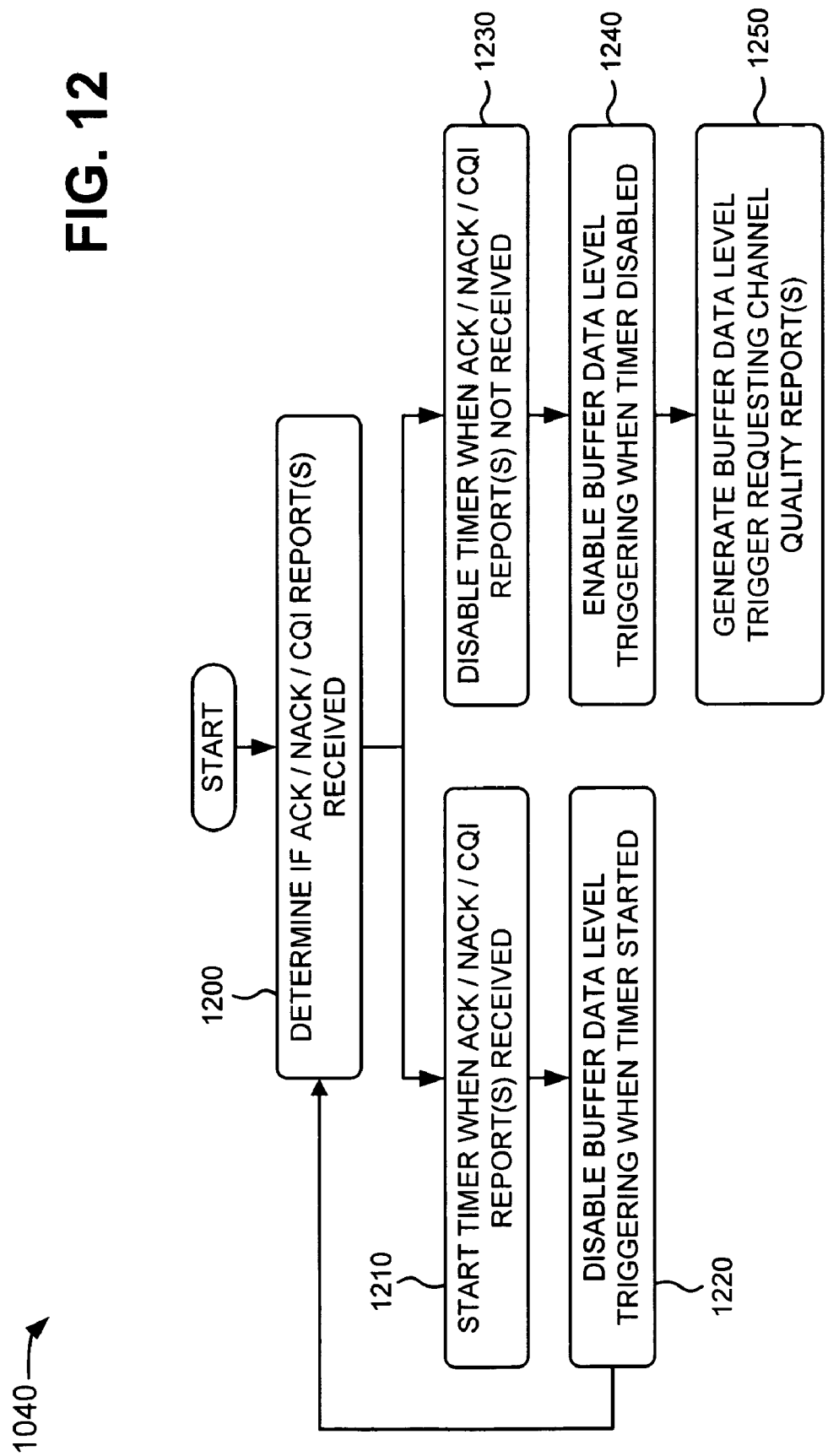

FIGS. 10-12 depict flow charts of an exemplary process 1000 for providing a channel quality estimate that optimizes use of reverse link resources according to embodiments described herein. In one embodiment, process 1000 may be performed by hardware and/or software components of base station 110. In other embodiments, process 1000 may be performed by hardware and/or software components of base station 110 in combination with hardware and/or software components of another device (e.g., communicating with base station 110).

As illustrated in FIG. 10, process 1000 may begin with transmission of data via a data channel (block 1010), and either receipt of feedback information associated with the data channel (block 1020) or a failure to receive feedback information associated with the data channel (block 1030). For example, in embodiments described above in connection with FIG. 1, base station 110 may establish a data channel (or link) 140 with user device 120. Data channel 140 may enable base station 110 to transmit communications or signals (e.g., telephone calls, text or image messaging, Internet browsing, gaming, paging, or other data communications) to user device 120. User device 120 may monitor a quality of data channel 140, and may generate channel quality feedback information 150 based on the monitoring of data channel 140. Base station 110 may either receive channel quality feedback information 150 (e.g., via reverse channel or link provided between base station 110 and user device 120) or may fail to receive channel quality feedback information 150.

Returning to FIG. 10, when feedback information associated with the data channel is not received (block 1030), a trigger requesting one or more channel quality reports may be generated (block 1040), and one or more of the requested channel quality reports may be received (block 1050). For example, in embodiments described above in connection with FIG. 1, if base station 110 fails to receive channel quality feedback information 150, base station 110 may generate trigger 160 requesting one or more channel quality reports, and may provide trigger 160 to user device 120. User device 120 may receive trigger 160, and may generate one or more channel quality reports 170 based on trigger 160. User device 120 may provide one or more channel quality reports 170 to base station 110.

As further shown in FIG. 10, when feedback information associated with the data channel is received (block 1020), it may be determined if conditions of the data channel are changing (block 1060). If data channel conditions are changing (block 1060—YES), process 1000 may return to blocks 1040 and 1050. If data channel conditions are not changing (block 1060—NO), an implicit channel quality estimate may be calculated based on the feedback information (block 1070). For example, in embodiments described above in connection with FIG. 1, if base station 110 receives channel quality feedback information 150, base station 110 may determine whether conditions in data channel 140 are changing (e.g., more or less than a specified threshold). If conditions in data channel 140 are changing, base station 110 may generate trigger 160 requesting one or more channel quality reports, and may provide trigger 160 to user device 120. User device 120 may receive trigger 160, and may generate one or more channel quality reports 170 based on trigger 160. User device 120 may provide one or more channel quality reports 170 to base station 110. If conditions in data channel 140 are not changing, base station 110 may calculate an implicit channel quality estimate based on channel quality feedback information 150.

Returning to FIG. 10, a channel quality may be calculated based on the implicit channel quality estimate and/or the one or more channel quality reports (block 1080), and parameters associated with the data channel may be adjusted based on the channel quality (block 1090). For example, in embodiments described above in connection with FIG. 1, base station 110 may determine a channel quality 180 based on the implicit channel quality estimate, one or more channel quality reports 170, or a combination of the implicit channel quality estimate and one or more channel quality reports 170. Base station 110 may utilize channel quality 180 for adjusting transmission parameters (e.g., modulation, coding, transport block size, output power, etc.) to optimize use of data channel 140 in terms of data throughput, delay, bit or block error rates, speech quality, or other performance measures.

Process block 1070 may include the process blocks depicted in FIG. 11. As illustrated in FIG. 11, process block 1070 may include increasing and/or decreasing the implicit channel quality estimate based on acknowledgement (ACK) and/or negative acknowledgement (NACK) information provided in the feedback information (block 1100). For example, in embodiments described above in connection with FIG. 3, channel quality feedback information 150 may include ACK/NACK reports received from user device 120, and control algorithm logic 310 of base station 110 may calculate channel quality estimate 350 based on the ACK/NACK reports. In one example, control algorithm logic 310 may calculate channel quality estimate 350 by increasing or decreasing a current channel quality estimate 350 whenever an ACK or a NACK is received by base station 110. Control algorithm logic 310 may set a ratio between increase and decrease steps in order reach a specified BLER target. In other examples, control algorithm logic 310 may calculate channel quality estimate 350, based on ACK/NACK information, using other control algorithms.

As further shown in FIG. 11, process block 1070 may include modifying and/or decreasing the implicit channel quality estimate based on a number of consecutive ACKs received since a last NACK (block 1110). For example, in embodiments described above in connection with FIGS. 3 and 4, decrease step adjustment logic 400 of base station 110 may receive channel quality feedback information 150 (e.g., from user device 120), and may generate decrease step adjustment 420 based on channel quality feedback information 150 and a decrease step adjustment algorithm. In one example, decrease step adjustment logic 400 may not adjust the increase step ($\Delta_{up}$), but may modify the decrease step ($\Delta_{down}$) (e.g., decrease adjustment step 420) each time a NACK report is received (e.g., from user device 120 via channel quality feedback information 150) based on a number of consecutive ACK reports received (e.g., from user device 120 via channel quality feedback information 150) since a last NACK report.

Returning to FIG. 11, process block 1070 may include maintaining the implicit channel quality estimate for a specified time period when two or more consecutive NACKs are received (block 1120). For example, in embodiments described above in connection with FIGS. 3 and 4, masking logic 410 of base station 110 may receive decrease step adjustment 420 from decrease step adjustment logic 400, and may generate channel quality estimate 350 based on decrease step adjustment 420 and a masking algorithm. In one example, masking logic 410 may implement a masking algorithm that maintains channel quality estimate 350 for a specified time if two or more consecutive NACK reports are received (e.g., via channel quality feedback information 150). This may permit any action taken on the first NACK report to have an effect before action is taken on the second NACK report.

Process block 1040 may include the process blocks depicted in FIG. 12. As illustrated in FIG. 12, process block 1040 may include determining if ACK, NACK, and/or CQI reports are received (block 1200), starting a timer when ACK, NACK, and/or CQI reports are received (block 1210), disabling buffer data level triggering when the timer is started (block 1220), and return to process block 1200. For example, in embodiments described above in connection with FIG. 6, a data level in a forward link (e.g., data channel 140) transmission buffer (e.g., provided in base station 110) may be used to trigger one or more direct channel quality reports if recent ACK/NACK or CQI information (e.g., reports) is lacking. This may be achieved by base station 110 polling user device 120 to send such reports. To determine what may be recent, a timer (e.g., timer started signal 630) could be started in base station 110 (e.g., by start timer logic 600) after reception of each ACK/NACK or CQI report. Buffer data level disabling logic 605 may receive timer started signal 630, and may disable a buffer data level trigger, as indicated by reference number 635. While the timer is running, buffer data level disabling logic 605 may disable buffer data level as a trigger for polling for direct channel quality reports from user device 120.

As further shown in FIG. 12, process block 1040 may include disabling the timer when ACK, NACK, and/or CQI reports are not received (block 1230), enabling buffer data level triggering when the timer is disabled (block 1240), and generating a buffer data level trigger requesting one or more channel quality reports (block 1250). For example, in embodiments described above in connection with FIG. 6, if feedback information (e.g., ACK/NACK/CQI reports 625) is not received by start timer logic 600, start timer logic 600 may not start the timer, as indicated by reference number 640. Buffer data level enabling logic 610 of base station 110 may receive timer not started signal 640, and may enable the buffer data level trigger, as indicated by reference number 645. In one example, while the timer is not running, buffer data level enabling logic 610 may enable buffer data level as a trigger for polling for direct channel quality reports from user device 120. Transmission triggering generation logic 615 of base station 110 may receive enable buffer data level trigger 645 from buffer data level enabling logic 610, and may generate a transmission buffer data level trigger 650 based on the received information.

Figure 13:
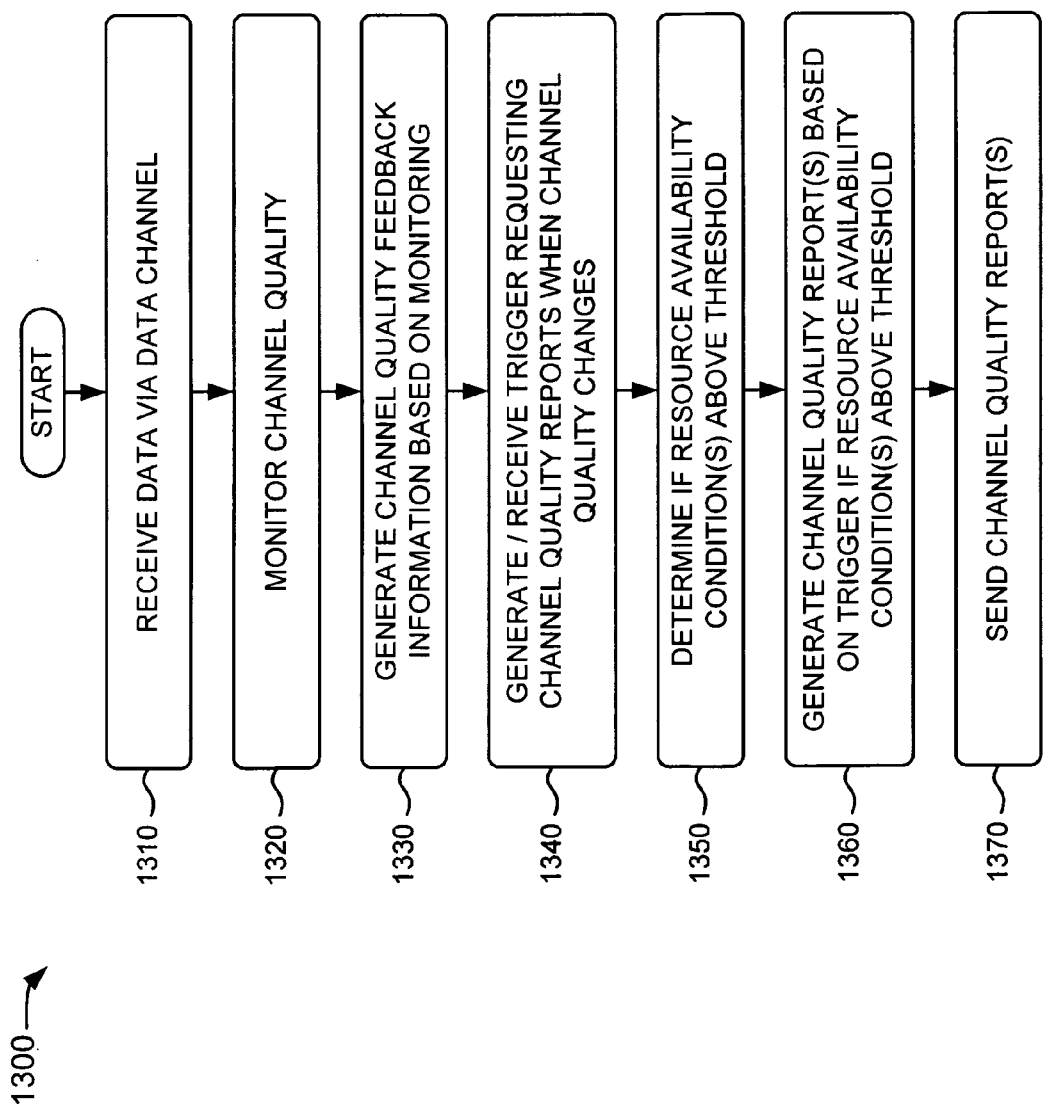
Figure 14:
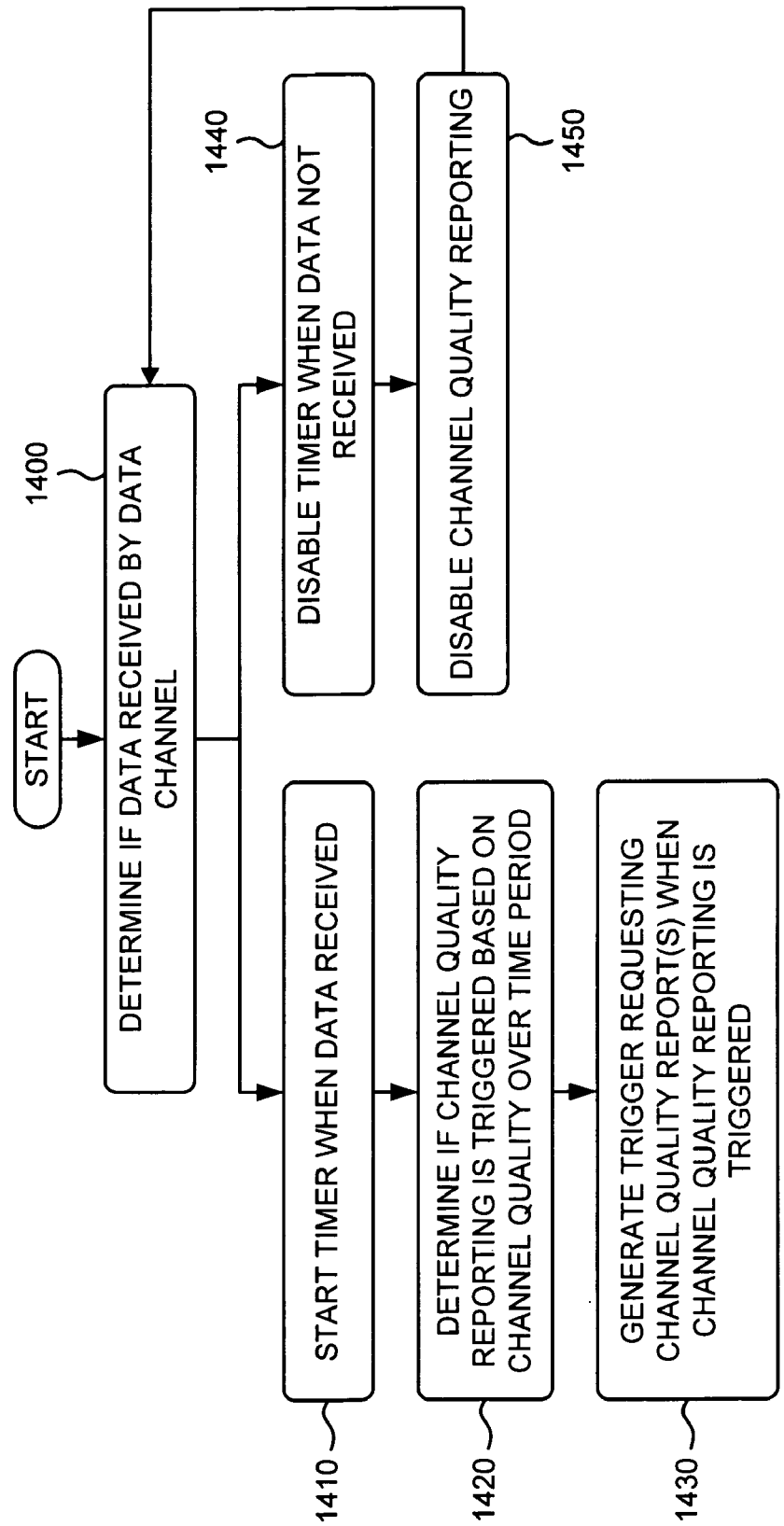

FIGS. 13 and 14 depict flow charts of an exemplary process 1300 for providing a channel quality estimate that optimizes use of reverse link resources according to embodiments described herein. In one embodiment, process 1300 may be performed by hardware and/or software components of user device 120. In other embodiments, process 1300 may be performed by hardware and/or software components of user device 120 in combination with hardware and/or software components of another device (e.g., communicating with user device 120).

As illustrated in FIG. 13, process 1300 may begin with receipt of data via a data channel (block 1310), monitoring a channel quality of the data channel (block 1320), and generating channel quality feedback information based on the monitoring (block 1330). For example, in embodiments described above in connection with FIG. 7, data channel receiving logic 700 of user device 120 may receive data via a data channel (e.g., data channel 140 from base station 110), and may provide data channel 140 to channel quality monitor logic 710. Channel quality monitoring logic 710 may receive information relating to data channel 140 from data channel receiving logic 700, may monitor the information relating to data channel 140, and may generate channel quality feedback information (e.g., channel quality feedback information 150) based on the monitoring of the information relating to data channel 140.

As further shown in FIG. 13, a trigger requesting one or more channel quality reports may be generated and/or received when the channel quality of the data channel changes (block 1340). For example, in embodiments described above in connection with FIG. 7, channel quality triggering logic 720 of user device 120 may receive channel quality feedback information 150 from channel quality monitoring logic 710, and may generate autonomous trigger 760 based on channel quality feedback information 150. In one example, channel quality triggering logic 720 may generate autonomous trigger 760 if channel quality (e.g., as provided by channel quality feedback information 150) changes by a sufficiently large amount in a sufficiently short period of time, and data is or has recently been received by user device 120.

Returning to FIG. 13, it may be determined if one or more resource availability conditions are above a threshold (block 1350), one or more channel quality reports may be generated based on the trigger if the one or more resource availability conditions are above the threshold (block 1360), and the one or more channel quality reports may be sent (block 1370). For example, in embodiments described above in connection with FIG. 7, trigger receiving logic 730 of user device 120 may receive autonomous trigger 760 and/or trigger 160 (e.g., from base station 110), and may generate trigger enable signal 770 or trigger disable signal 780. Trigger receiving logic 730 may provide trigger enable signal 770/trigger disable signal 780 to channel quality report generation logic 740. Channel quality report generation logic 740 may receive trigger enable signal 770 from trigger receiving logic 730, and may generate channel quality reports 170 based on trigger enable signal 770. User device 120 may provide channel quality reports 170 to base station 110. Resource availability condition logic 750 of user device 120 may communicate with channel quality report generation logic 740, and may permit channel quality report generation logic 740 to generate channel quality reports if a level of available resources in user device 120 is above a configurable threshold limit.

Process block 1340 may include the process blocks depicted in FIG. 14. As illustrated in FIG. 14, process block 1340 may include determining if data is received over the data channel (block 1400), starting a timer when data is received over the data channel (block 1410), determining if channel quality reporting is triggered based on channel quality over a time period (block 1420), and generating a trigger requesting one or more channel quality reports when channel quality reporting is triggered (block 1430). For example, in embodiments described above in connection with FIGS. 7 and 8, start timer logic 800 of user device 120 may receive autonomous trigger 760 and/or trigger 160 (e.g., from base station 110), and may start a timer, as indicated by reference number 840, based on the received information. In one example, start timer logic 800 may start a configurable timer each time data is received by user device 120 (e.g., from base station 110). Start timer logic 800 may provide timer started signal 840 to enable channel quality reporting logic 810. Enable channel quality reporting logic 810 may receive timer started signal 840 from start timer logic 800, and may enable trigger 850 based on timer started signal 840. Enable channel quality reporting logic 810 may provide enable trigger 850 to trigger enabling/disabling logic 830. If trigger enabling/disabling logic 830 receives enable trigger 850, trigger enabling/disabling logic 830 may generate trigger enable signal 770. Trigger enable signal 770 may request channel quality reports.

As further shown in FIG. 14, process block 1340 may include disabling the timer when data is not received over the data channel (block 1440), disabling channel quality reporting when the timer is disabled (block 1450), and returning to process block 1400. For example, in embodiments described above in connection with FIGS. 7 and 8, start timer logic 800 may not start the timer, as indicated by reference number 860, if data is not received by user device 120. Start timer logic 800 may provide timer not started signal 860 to disable channel quality reporting logic 820. In one example, while the timer is not running (as indicated by reference number 860), disable channel quality reporting logic 820 may disable trigger 870 for requesting generation of channel quality reports from user device 120. Disable channel quality reporting logic 820 may provide disable trigger 870 to trigger enabling/disabling logic 830. If trigger enabling/disabling logic 830 receives disable trigger 870, trigger enabling/disabling logic 830 may generate trigger disable signal 780, which may disable channel quality reporting.

Embodiments described herein may provide systems and/or methods that provide a channel quality estimate that optimizes use of reverse link resources. For example, in one embodiment, the systems and/or methods may combine an implicit channel quality estimate with specific event-triggered channel quality reports. The block error information may need to be transmitted on the reverse link to enable selective retransmissions. The systems and/or methods may use the block error information to calculate the implicit channel quality estimate, and may regulate the implicit channel quality estimate towards a specific block error rate target. In one example, the systems and/or methods may utilize a control algorithm that tracks channel quality variations and reduces a need for the event-triggered channel quality reports. The systems and/or methods may trigger the channel quality reports when necessary. Such an arrangement may provide a channel quality estimate, and may optimize use of reverse link resources by minimizing a need for the event-triggered channel quality reports.

The foregoing description of embodiments provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 10-14, the order of the blocks may be modified in other embodiments. Further, non-dependent blocks may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

It will be apparent that exemplary embodiments, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. The logic may include hardware, such as an application specific integrated circuit, a field programmable gate array, a processor, or a microprocessor, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a first device associated with a network, the method comprising:
   receiving feedback information from a second device, wherein the feedback information is associated with a data channel between the first device and the second device;
   determining whether a quality of the data channel is changing based on the feedback information associated with the data channel received from the second device;
   calculating an implicit channel quality estimate based on the feedback information;
   transmitting a trigger requesting a channel quality report from the first device to the second device, wherein the trigger requesting the channel quality report is transmitted to the second device responsive to determining that the quality of the data channel is changing; and
   receiving the requested channel quality report from the second device.

2. The method of claim 1, where transmitting a trigger requesting a channel quality report comprises:
   transmitting the trigger requesting the channel quality report when the first device is receiving data.

3. The method of claim 1, where transmitting a trigger requesting a channel quality report comprises:
   determining whether at least one of an acknowledgement (ACK) report, a negative acknowledgement (NACK) report, or a channel quality index (CQI) report is received from the second device;
   starting a timer when at least one of an acknowledgement (ACK) report, a negative acknowledgement (NACK) report, or a channel quality index (CQI) report is received from the second device;
   disabling buffer data level triggering when the timer is started;
   disabling the timer when at least one of an acknowledgement (ACK) report, a negative acknowledgement (NACK) report, or a channel quality index (CQI) report is not received from the second device;
   enabling buffer data level triggering when the timer is disabled; and
   generating a buffer data level trigger, requesting the channel quality report, when buffer data level triggering is enabled.

4. The method of claim 1, further comprising:
   calculating a channel quality of the data channel based on at least one of the implicit channel quality estimate or the requested channel quality report; and
   adjusting parameters associated with the data channel based on the channel quality.

5. The method of claim 1, where calculating an implicit channel quality estimate comprises at least one of:
   increasing or decreasing the implicit channel quality estimate based on acknowledgement (ACK) and negative acknowledgement (NACK) information provided in the feedback information;
   modifying or decreasing the implicit channel quality estimate based on a number of consecutive acknowledgements (ACKs) received since a last negative acknowledgement (NACK); or
   maintaining the implicit channel quality estimate for a specified time period when two or more consecutive negative acknowledgements (NACKs) are received.

6. A method, performed by a first device associated with a network, comprising:
   monitoring a channel quality of a data channel between the first device and a second device;
   generating channel quality feedback information based on the monitoring;
   generating or receiving a trigger requesting a channel quality report responsive to the channel quality changing;
   determining if a resource availability condition is above a threshold,
   generating the channel quality report responsive to the trigger, where generating the channel quality report comprises,
      generating the channel quality report based on the trigger when the resource availability condition is above the threshold, and
      preventing generating the channel quality report based on the trigger when the resource availability condition is below the threshold; and
   sending the generated channel quality report.

7. The method of claim 6, where generating or receiving a trigger comprises:
   determining if data is received over the data channel at the first device;
   starting a timer when data is received over the data channel at the first device;
   determining if channel quality reporting is triggered based on changes in the monitored channel quality over a time period; and
   generating the trigger requesting the channel quality report responsive to the channel quality reporting being triggered based the changes in the monitored channel quality.

8. The method of claim 7, further comprising:
   disabling the timer when data is not received over the data channel; and
   disabling channel quality reporting when the timer is disabled.

9. A first device associated with a network, the first device comprising:
   processing logic to:
   receive feedback information from a second device, wherein the feedback information is associated with a data channel between the first device and a second device,
   determine whether a quality of the data channel is changing based on the feedback information associated with the data channel received from the second device,
   calculate an implicit channel quality estimate based on the feedback information,
   transmit a trigger requesting a channel quality report from the first device to the second device, wherein the trigger requesting the channel quality report is transmitted to the second device responsive to determining that the quality of the data channel is changing, and
   receive the requested channel quality report from the second device.

10. The first device of claim 9, where, when transmitting a trigger requesting a channel quality report, the processing logic further:

determines whether at least one of an acknowledgement (ACK) report, a negative acknowledgement (NACK) report, or a channel quality index (CQI) report is received from the second device;

starts a timer when at least one of an acknowledgement (ACK) report, a negative acknowledgement (NACK) report, or a channel quality index (CQI) report is received from the second device;

disables buffer data level triggering when the timer is started;

disables the timer when at least one of an acknowledgement (ACK) report, a negative acknowledgement (NACK) report, or a channel quality index (CQI) report is not received from the second device;

enables buffer data level triggering when the timer is disabled; and generates a buffer data level trigger, requesting the channel quality report, when buffer data level triggering is enabled.

11. The first device of claim 9, where the processing logic further:

calculates a channel quality of the data channel based on at least one of the implicit channel quality estimate or the requested channel quality report; and adjusts parameters associated with the data channel based on the channel quality.

12. The first device of claim 11, where the parameters associated with the data channel comprise one or more of:
a modulation;
a coding;
a transport block size; or
an output power.

13. The first device of claim 9, where, when calculating an implicit channel quality estimate, the processing logic further at least one of:

increases or decreases the implicit channel quality estimate based on acknowledgement (ACK) and negative acknowledgement (NACK) information provided in the feedback information;

modifies or decreases the implicit channel quality estimate based on a number of consecutive acknowledgements (ACKs) received since a last negative acknowledgement (NACK); or maintains the implicit channel quality estimate for a specified time period when two or more consecutive negative acknowledgements (NACKs) are received.

14. The first device of claim 9, where the first device comprises a base station.

15. The first device of claim 9, where the data channel comprises a high-speed packet access (HSPA) based data channel.

16. The first device of claim 9, where the channel quality feedback information comprises one or more of:
an acknowledgement (ACK);
a negative acknowledgement (NACK);
a channel quality indication (CQI);
a discontinuous transmission (DTX) bit;
a block error rate (BLER);
an average number of transmissions;
a bit error rate;
a power control command;
a carrier-to-interference ratio; or
a received signal strength.

17. The first device of claim 9, where the requested channel quality report is received via a reverse link.

18. The first device of claim 17, where the reverse link comprises a high-speed downlink packet access (HSDPA) based reverse link.

19. A first device associated with a network, comprising:
processing logic to:
monitor a channel quality of a data channel between the first device and a second device,
generate channel quality feedback information based on the monitoring,
generate or receive a trigger requesting a channel quality report responsive to the channel quality changing,
determine if a resource availability condition is above a threshold,
generate the channel quality report responsive to the trigger when the resource availability condition is above the threshold,
send the generated channel quality report when the resource availability condition is above the threshold; and
prevent generating the channel quality report responsive to the trigger when the resource availability condition is below the threshold.

20. The first device of claim 19, where the processing logic further:
determines if data is received over the data channel;
starts a timer when data is received over the data channel;
determines if channel quality reporting is triggered based on the channel quality over a time period; and
generates the trigger requesting the channel quality report when the channel quality reporting is triggered.

21. The first device of claim 20, where the processing logic further:
disables the timer when data is not received over the data channel; and
disables channel quality reporting when the timer is disabled.

22. The first device of claim 19, where the first device comprises a user device.

23. The first device of claim 19, where the data channel comprises a high-speed packet access (HSPA) based data channel.

24. The first device of claim 19, where the channel quality feedback information comprises one or more of:
an acknowledgement (ACK);
a negative acknowledgement (HACK);
a channel quality indication (CQI);
a discontinuous transmission (DTX) bit;
a block error rate (BLER);
an average number of transmissions;
a bit error rate;
a power control command;
a carrier-to-interference ratio; or
a received signal strength.

25. The first device of claim 19, where the generated channel quality report is sent via a reverse link.

26. The first device of claim 25, where the reverse link comprises a high-speed downlink packet access (HSDPA) based reverse link.

* * * * *

UNITED STATES PATENT AND TRADEMARK OFFICE
CERTIFICATE OF CORRECTION

| | | |
|---|---|---|
| PATENT NO. | : 8,090,323 B2 | Page 1 of 1 |
| APPLICATION NO. | : 12/042084 | |
| DATED | : January 3, 2012 | |
| INVENTOR(S) | : Craig et al. | |

It is certified that error appears in the above-identified patent and that said Letters Patent is hereby corrected as shown below:

In Fig. 11, Sheet 11 of 14, for Tag "1100", Line 1, delete "CHANEL" and insert -- CHANNEL --, therefor.

In Column 7, Line 29, delete "refers" and insert -- [·] refers --, therefor.

In Column 22, Line 17, in Claim 6, delete "threshold," and insert -- threshold; --, therefor.

In Column 24, Line 47, in Claim 24, delete "(HACK);" and insert -- (NACK); --, therefor.

Signed and Sealed this
Twenty-seventh Day of November, 2012

David J. Kappos
*Director of the United States Patent and Trademark Office*